(12) United States Patent
Phillips et al.

(10) Patent No.: US 10,836,520 B2
(45) Date of Patent: Nov. 17, 2020

(54) METHOD AND SYSTEM FOR MONITORING FOOD PACKAGING OPERATIONS AND COLLECTION AND DISSEMINATION OF DATA RELATED THERETO

(71) Applicant: YTA HOLDINGS, LLC, Los Angeles, CA (US)

(72) Inventors: Jonathan R. Phillips, San Juan Capistrano, CA (US); Richard C. Blackburn, Santa Ana, CA (US); Scott D. Smith, Laguna Niguel, CA (US)

(73) Assignee: YTA HOLDINGS, LLC, Los Angeles, CA (US)

( * ) Notice: Subject to any disclaimer, the term of this patent is extended or adjusted under 35 U.S.C. 154(b) by 837 days.

(21) Appl. No.: 15/006,103

(22) Filed: Jan. 25, 2016

(65) Prior Publication Data

US 2016/0221699 A1 Aug. 4, 2016

Related U.S. Application Data

(60) Provisional application No. 62/107,400, filed on Jan. 24, 2015, provisional application No. 62/107,479, (Continued)

(51) Int. Cl.
*G06F 7/00* (2006.01)
*B65B 23/02* (2006.01)
*B65B 57/10* (2006.01)
*H04L 29/08* (2006.01)
*H04L 12/66* (2006.01)
(Continued)

(52) U.S. Cl.
CPC .............. *B65B 23/02* (2013.01); *B65B 57/10* (2013.01); *B65B 57/16* (2013.01); *B65B 59/00* (2013.01); *H04L 12/66* (2013.01); *H04L 67/1097* (2013.01)

(58) Field of Classification Search
None
See application file for complete search history.

(56) References Cited

U.S. PATENT DOCUMENTS 3,342,012 A * 9/1967 Reading .................. B65B 23/02
53/494
4,765,487 A * 8/1988 Bliss ...................... B65G 57/24
209/510
(Continued)

OTHER PUBLICATIONS

International Search Report from corresponding PCT Application No. PCT/US2016/014787 dated May 27, 2016.
(Continued)

*Primary Examiner* — Yolanda R Cumbess
(74) *Attorney, Agent, or Firm* — Hankin Patent Law, APC; Marc E. Hankin

(57) ABSTRACT

The present disclosure includes a method and system for collecting data from multiple measuring points within equipment. Once collected, the data may be consolidated and stored in a database remotely. The data may then be used to optimize system performance either locally or across facilities. Such optimization may include determining the proper handling of packages of objects, such as eggs, that are not ideally marked or that are not properly packed. Such optimization may also include the resetting and/or recalibrating of laser systems within one or more facilities based on the data collected.

12 Claims, 15 Drawing Sheets

Related U.S. Application Data filed on Jan. 25, 2015, provisional application No. 62/107,520, filed on Jan. 26, 2015, provisional application No. 62/107,541, filed on Jan. 26, 2015.

(51) Int. Cl.
  *B65B 59/00* (2006.01)
  *B65B 57/16* (2006.01)

(56) References Cited

U.S. PATENT DOCUMENTS

| | | | | |
|---|---|---|---|---|
| 5,157,903 | A * | 10/1992 | Nakashima | B65B 11/54 |
| | | | | 493/476 |
| 6,234,320 | B1 * | 5/2001 | Hebrank | A01K 43/00 |
| | | | | 209/510 |
| 2009/0291096 | A1 | 11/2009 | Phelps et al. | |
| 2011/0177206 | A1 * | 7/2011 | Anderson | B65D 85/32 |
| | | | | 426/87 |
| 2011/0204137 | A1 * | 8/2011 | Scharfenort | B32B 29/002 |
| | | | | 235/375 |
| 2011/0300023 | A1 * | 12/2011 | Cox | A23B 5/0052 |
| | | | | 422/109 |
| 2012/0114820 | A1 | 5/2012 | Griffiths et al. | |
| 2013/0212981 | A1 | 8/2013 | Chait et al. | |
| 2014/0222522 | A1 * | 8/2014 | Chait | G06Q 10/0637 |
| | | | | 705/7.36 |
| 2015/0138535 | A1 * | 5/2015 | Walukas | G01N 33/085 |
| | | | | 356/51 |

OTHER PUBLICATIONS

Written Opinion of the International Searching Authority from corresponding PCT Application No. PCT/US2016/014787 dated May 27, 2016.

* cited by examiner

|  | USDA | Non-USDA |
|---|---|---|
| Grade | (tracecode) | X |
| Size | (tracecode) | X |
| Packing Plant | (tracecode) | (tracecode) |
| Julian Date | (tracecode) | (tracecode) |
| Time | (tracecode) | (tracecode) |
| Lane | X | X |
| Packer SN | X | X |
| MHS SN | X | X |
| Column | (tracecode) | (tracecode) |
| Nest Farm | X | X* |
| Egg Brand | X | X |
| Carton Size | X | X |
| Campaign | X | X |

*The nest farm is included in the carton trace code, but not the Egg trace code.

1400

Line 1

| | Grade (1402) | Size (1404) | Space (1406) | Packing Plant (1408) |
|---|---|---|---|---|
| Examples | A, AA | M, L, X, J | | P1306, P1664E, 120355 |
| Field Length | 2 | 1 | 1 | 6 |
| Data Format | Alpha – standard grade designations | Alpha – standard size designations | | Alphanumeric – USDA or non-USDA Plant code (_ = space) |

Line 2

| | Julian Date (1412) | Space (1414) | Column (1416) | Time (3 min Interval) (1418) |
|---|---|---|---|---|
| Examples | 077 | | 13 | 7J |
| Field Length | 3 | 1 | 2 | 2 |
| Data Format | Numeric – One based day count from Jan 1 of current year. Accounting for leap year. | | Numeric sequential column count across all packers using base 27 | Alphanumeric – 3 minute interval count from midnight using base 27 |

FIG. 14

METHOD AND SYSTEM FOR MONITORING FOOD PACKAGING OPERATIONS AND COLLECTION AND DISSEMINATION OF DATA RELATED THERETO

CROSS-REFERENCE TO RELATED APPLICATIONS

This application claims the benefit of U.S. Provisional Application No. 62/107,400 filed on Jan. 24, 2015, U.S. Provisional Application No. 62/107,479 filed on Jan. 25, 2015, U.S. Provisional Application No. 62/107,520 filed on Jan. 26, 2015, and U.S. Provisional Application No. 62/107,541 filed on Jan. 26, 2015, the contents of which are incorporated herein by reference in their entirety.

BACKGROUND

The disclosure relates generally to the field of food product processing, and more particularly methods and systems for monitoring food packaging operations and collecting data related thereto. While reference is made herein to eggs in particular, it should be understood that this disclosure is directed to all food products in which a laser mark may be applied thereon.

In the egg packing industry, eggs typically undergo a great deal of processing before they are ready to be sold to the consuming public. In many circumstances, for example, eggs pass through several processing stations where they are washed, candled, weighed, graded, and packed into packages (e.g., cartons, crates, or other commercially distributed containers). Examples of such processing stations and mechanisms for conveying eggs from station to station are described, for instance, in the following U.S. patents assigned to Diamond Automations, Inc. (U.S. Pat. Nos. 4,189,898; 4,195,736; 4,505,373; 4,519,494; 4,519,505: 4,569,444; 4,750,316; 5,321,491; and 6,056,341) and TEN Media LLC (U.S. Pat. No. 8,455,030), which are incorporated herein by reference in their entirety. As a reference, it is not uncommon for a facility in which these stations operate to output about one million eggs in a single day. Accordingly, to be commercially acceptable, the throughput of the stations needs to be quite high, with some stations typically processing on the order of 20,000 eggs per hour.

The egg packing industry uses devices known as "packers" to pack the eggs into the packages. Typically, a packer includes a conveyor (e.g., a belt conveyor, roller conveyor, chain conveyor, etc.) that moves empty packages through an egg loading section (where the eggs are loaded into the egg loading section from above) and then moves the filled packages to a package closing section that is responsible for closing the lids of the packages. The eggs may be supplied to the egg packer via a grader system.

An egg packing process that uses "packers," typically uses bulk belts to bring eggs from a bulk supply location. The eggs are cleaned or disinfected, in some instances using UV light while clamped to transport chains, and in some instances through immersion in sanitizing wash water. The eggs are then inspected either electronically or manually, they are weighed to establish size, inspected for cracks using ultrasonic inspection and loaded into a chain driven carriage mechanism ("Transfer Loader"). The egg is then normally transported to one of a plurality of packing machines by the aforementioned carriage mechanism. The particular packing machine to which any individual egg may be transported is determined by a computer. This process or elements thereof up to, but not including, the packing machine, constitute grading ("Grading" and the "Grader"). The carriage mechanism typically consists of one or a plurality of chains, running the length of the Grader past all the packing machines in the horizontal plane ("Grader Chains"). The packing machines are usually configured with an egg flow perpendicular to the Grader Chain in the horizontal plane.

Because shell eggs are a perishable item susceptible to spoilage, egg packages typically have expiration (or sell-by) dates marked on them. Thus, certain government bodies, such as the Food and Drug Administration (FDA), the United States Department of Agriculture (USDA), and various state governments generally require that shell egg cartons have printed on the carton a sell-by date, a packaging date (printed as a Julian date, i.e., a three-digit day number relative to the day of the year in which the eggs were packaged), and a plant code. The grade and size of the eggs may also be printed on the carton.

A problem with this type of dating is that consumers often remove the eggs from a carton and put them in a special holder of their refrigerator and therefore lose the important expiration date information. Although it is not believed to be a widespread practice, there have been instances where establishments have removed eggs from one printed carton and placed in another having a later expiration date which can lead to usage beyond the date by which salmonella bacteria can develop into a dangerous condition.

The egg industry uses Continuous Inkjet Printer technology ("CIJ Printers") to print Size, Grade and Date information together with other information or images and logos ("Data") on to the surface of an egg shell of a fresh egg travelling through an egg grading machine. The CIJ Printers are traditionally placed in a location on the production line that is responsible for grading the eggs and the site for such installation is chosen to minimize the number of CIJ Printers required for a given installation. CIJ Printers have typically been installed on the Grader Chains as near to the Transfer Loader as practical, and typically (although not always), prior to all the packing machines to which almost all eggs are later diverted.

As a consequence of the location, the CIJ Printer provides a relatively economic means of applying Data that limits the number of printing heads. Like most processing methods the execution of these installs represents a compromise of many factors, and the method described above has disadvantages which adversely affect the equipment, retailers, and consumers of eggs negatively. The negative elements of the method described above include:

a) The CIJ Printer's print-head is installed inverted below the flow of eggs;

b) Egg debris or broken eggs can fall into the jetting mechanism of the inkjet printer causing downtime and impeding print quality;

c) The flow of ink is upward and therefore stray ink can fall backwards and result in downtime and maintenance issues;

d) The linear speed of the eggs as they pass the print-head is fast and therefore the amount of data is limited;

e) The linear speed of the eggs as they pass the print-head is fast and therefore the print quality achieved is typically poor quality;

f) The eggs usually travel in the Grader Chain clamped long ways and therefore the print applied to the eggshell is on the side of the egg in a print direction equal to the direction of egg travel (along the long axis of the egg) with such print being normally unreadable by a consumer without handling the eggs in the carton;

a. Handling the eggs in a carton can lead to contamination of the egg; and b. Handling of the egg in the carton can lead to increased levels of breakage by consumers inspecting eggs in the retail store where they are sold;

g) A reasonable high proportion of eggs will have very poor or unreadable marks due to a combination of these factors; and h) If the grader has a minor malfunction, an egg can be inadvertently diverted (or fall) from the Grader at an unplanned Packing Machine (i.e. not the one the computer had intended). Because the plurality of packing lanes often process multiple brands of eggs concurrently, if an egg has brand data printed on it, or size data printed on it, and incorrectly branded or sized egg appearing in the wrong carton can be a legal and public relations issue and can cause both consumer and retailer dissatisfaction.

It is known to use laser to mark indicia onto perishable products for the purpose of tracking their pedigree and/or integrity (e.g., using date codes and/or trace codes), as well as for allowing textual or graphical advertising messages to be disseminated via such products. An example of such a system for laser marking such information on shell eggs is described, for example, in U.S. Pat. No. 8,084,712 ("the '712 Patent"), issued Dec. 27, 2011 and assigned to TEN Media, LLC. The disclosure of the '712 Patent is incorporated by reference in its entirety.

The approach described in the '712 Patent is to laser mark eggs as they are conveyed at high speed during the grading process. Although this approach has proven effective for certain applications, the extremely high throughput of the grading machines, the lack of uniformity in moisture content of the surface of individual eggs during the grading process, and the significant amount of dust created during the laser marking process, among other things, have made it challenging to mark individual eggs with sufficient accuracy, reliability, and consistency for certain purposes. Examples of systems and methods for improving laser marking of shell eggs are described, for instance, in the following U.S. patents assigned to TEN Media, LLC: U.S. Pat. Nos. 8,499,718; 8,455,026; 8,657,098; 8,455,030; 8,823,758; and 8,715,767, the entire contents of each of which are incorporated herein by reference.

Shell egg grading and packaging facilities are required to comply with a number of regulatory, customer, and internally imposed requirements to ensure the safe production and packaging of shell eggs. These facilities include in-line processing facilities, where egg processing occurs at the same location as the egg production facility. This processing method is generally the most efficient egg collection and processing method of eggs available because eggs are delivered from the egg production facility directly to the egg processing facility by an enclosed conveyor system. In off-line processing, the egg processing occurs separately from the egg production facility, which may be referred to as satellite farms. Satellite farms are egg production facilities that are located at a different location from the egg processing facility, and eggs produced at satellite farms must be gathered and delivered to the egg processing facility.

Additionally, there may be "nest run" eggs, which are eggs that have been packed as they come from the production facility possibly without having been washed, sized and/or candled for quality. Generally, nest run eggs are of first-rate quality, provided good flock-management practices are in place. However, because these eggs may be transported to a processing facility at another location before they are washed, graded, and packed, the carts on which they are transported may be a source of contamination, such as Salmonella. In general, because a production facility may receive shell eggs from various sources, there is always a possibility of cross-contamination.

When utilizing a laser marking system, however, additional problems may occur. Lasers typically drift and at times are adjusted by operating personnel at an egg processing plant when the eggs are marked with a laser. The problem is that these adjustments may place the laser system out of compliance with the operating specifications of the system.

Additionally the business environment frequently requires short-term changes in production planning, and packer and grader monitoring and data collection provides production monitoring capabilities, including total volume and product-level data, to improve scheduling and production control activities. Packer and grader monitoring and data collection also allows for remote analysis of detailed performance characteristics of grading and packaging facilities to determine maintenance and repair priorities.

As such, there is a need in the art for a system and method to improve the reliability and quality of applying markings to eggs as well as other food products, including a system and method for ensuring any laser system employed remains in compliance with the operating specification of the system. There is also need for all information related to grading and processing eggs at shell egg grading and packaging facilities to be processed through a common data collector and then consolidated and stored at a central location remote from the facilities. This central location should be accessible (after authentication and encryption) by all interested parties that have a need for such information for commercial and regulatory purposes, such as production planning and analysis, improving production efficiency across multiple facilities, and egg-source-specific product recalls.

BRIEF SUMMARY

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with embodiments herein, the present disclosure includes a method and system for applying markings on a food product by applying a radiant energy to the food product in such a manner to form a permanent marking thereon. The markings include text and graphics, and can include an advertisement, freshness information, traceability data, or other types of relevant information, or any combination thereof. A laser is preferably employed as the radiant energy source. Desirably, the radiant energy is applied so as to leave much of the area of the food product unaffected so as to form contrast between the unaffected areas and the marking. The method preferably forms the markings on the food product while the product moves through a predetermined region of a food processing system. The performance or characteristics of the laser may be adjusted in response to selected characteristics of the food product in order to optimize the marking applied thereon. Further, the interaction of the laser with the food product may be monitored by any suitable means and the depth or other characteristics of the laser marking may be adjusted in response to such parameters.

In a preferred embodiment, the present disclosure includes a method and system for applying markings on an egg by applying a radiant energy source to the shell of the egg so as to cause discoloration of the egg shell to form a permanent marking. In a preferred embodiment, the markings are made by laser etching without applying a foreign material to the egg shell.

In accordance with embodiments herein, the present disclosure includes an apparatus for applying markings on food products that is operable in association with a food packing system that packages the food products. The apparatus comprises a radiant energy source located in proximity to the food packing system so that the radiant energy source can apply radiant energy to the food product and form markings thereon.

A preferred embodiment includes an apparatus for applying markings on eggs that is operable in association with an egg-handling machine that performs washing, candling, grading, and packing of eggs. The apparatus comprises a radiant energy source located in proximity to the egg-handling machine, so that the radiant energy source can apply radiant energy to the egg and form the markings. In a preferred embodiment, the egg has a marking applied thereon, wherein the marking is formed at least in part by discolored material on the egg shell. The egg may include the marking being formed entirely by discolored material of the egg shell. The egg may also be raw or pasteurized. The radiant energy may be applied by a laser. The markings may be formed by a generally stationary radiant energy source as the egg is transported past the source.

In some embodiments, the present disclosure provides a method and system for applying markings on food products, comprising conveying the food product to a marking station having at least one laser marking device configured to apply laser energy of sufficient intensity to etch indicia on the food product, and activating the laser device to apply laser energy to the food product and etch the indicia thereon. The indicia includes text and graphics, and can include an advertisement or other graphical image, freshness information, traceability data, or other types of relevant information, or any combination thereof. In a preferred embodiment, the food product is an egg, and the laser etches the indicia on the outer surface of the shell of the egg. The applied laser energy may ablate and/or discolor the surface of the egg shell to an approximate depth that is within the range of about 8 to about 25 micrometers. The applied laser energy may ablate and/or discolor the surface of the egg shell to an approximate depth that is within the range of about 1.5 to about 8 percent of the thickness of the egg shell.

In accordance with embodiments herein, the present disclosure includes a system and method that protects the laser system by performing a daily reset in the lasers to ensure that they are operating in compliance with the operating specifications of the system.

In accordance with embodiments herein, the present disclosure provides gateway and cloud-based systems and methods for collecting data from multiple shell egg grading and packaging facilities, consolidating the collected data, and storing the consolidated data in an offsite database remotely accessible to authorized users. Typically, there is a gateway for each grading and packing facility, wherein such gateway may be in communication with at least one gateway from other facilities. The gateway and cloud-based data system provide a single system for each grading and packaging facility that consolidates all production, performance, and other compliance data from that facility, and passes that data to a remote storage location. The data stored at the remote storage location is selectively available to local systems at grading and packaging facilities, such as laser marking systems and local data displays.

The production and performance data collected may include data related to operation of the grading and packaging facilities, such as data from grader sensors and packing sensors, as well as traceability data related to the shell eggs packaged at the grading and packaging facilities, such as a sell-by date, a plant code, a packaging date, time of processing, processing lane, etc., as well as the size and grade of the shell eggs.

Because the gateway and cloud-based data system contains data from multiple plants within or across enterprises, it provides reporting and analysis tools to evaluate individual plant production, and identify cause/effect relationships within production processes and methods. Additionally, the gateway and cloud-based data system also provides methods of tracking egg sources, allowing egg source information to be stored in a manner allowing egg-source-specific product recalls if required.

In some embodiments, the present disclosure provides that the system and method for protecting the laser system and the gateway and cloud-based systems and methods for collecting data from multiple shell egg grading and packaging facilities are part of the same system and method.

In accordance with embodiments herein, the present disclosure includes systems and methods for collecting data from multiple egg grading and packaging facilities, consolidating the collected data, and storing the consolidated data in an offsite database remotely accessible to authorized users. The production and performance data collected may include data related to the operating of graders and packers in multiple grading and packaging facilities, such as data from grader sensors and packing sensors, as well as traceability data related to the shell eggs marked and packaged at each of the grading and packaging facilities, such as sell-by dates, plant codes, packaging dates, sell-by dates, packaging dates, size, grade, time of production, production lane, etc.

In accordance with embodiments herein, the present disclosure includes systems and methods for collecting failure mode data and diagnostic information that can be used to prioritize and drive specific corrective actions. In some embodiments, this includes a mechanism, such as a sensor array, to track missing eggs and determine whether a carton should be closed or take other corrective action.

In some embodiments, the present disclosure provides that these systems and methods for collecting data are part of either or both the systems and methods for protecting the laser system and the gateway and cloud-based systems and methods for collecting data from multiple shell egg grading and packaging facilities. In some embodiments, at least one of these systems collects and aggregates data from a sensor array.

Thus, in some embodiments, the gateway and cloud-based system provides a single system for each grading and packaging facility that consolidates all production, performance, and other compliance data from that facility and passes that data to a remote storage location. The data at that remote storage location is then available to local systems at grading and packaging facilities, such as laser marking systems and local data displays.

Still other advantages, aspects and features of the subject disclosure will become readily apparent to those skilled in the art from the following description wherein there is shown and described a preferred embodiment of the present disclosure, simply by way of illustration of one of the best modes best suited to carry out the subject disclosure As it will be realized, the present disclosure is capable of other different embodiments and its several details are capable of modifications in various obvious aspects all without departing from the scope herein. Accordingly, the drawings and descriptions will be regarded as illustrative in nature and not as restrictive.

BRIEF DESCRIPTION OF THE DRAWINGS

The accompanying drawings incorporated herein and forming a part of the specification illustrate the example embodiments

FIG. 14 is a schematic diagram illustrating an example of traceability data that may be marked on a shell egg, together with an illustration of the parameters of the elements of the traceability data, which may be stored in the example of a data entry shown in FIG. 13, in accordance with the present disclosure.

DETAILED DESCRIPTION OF THE PREFERRED EMBODIMENTS

Figure 1:
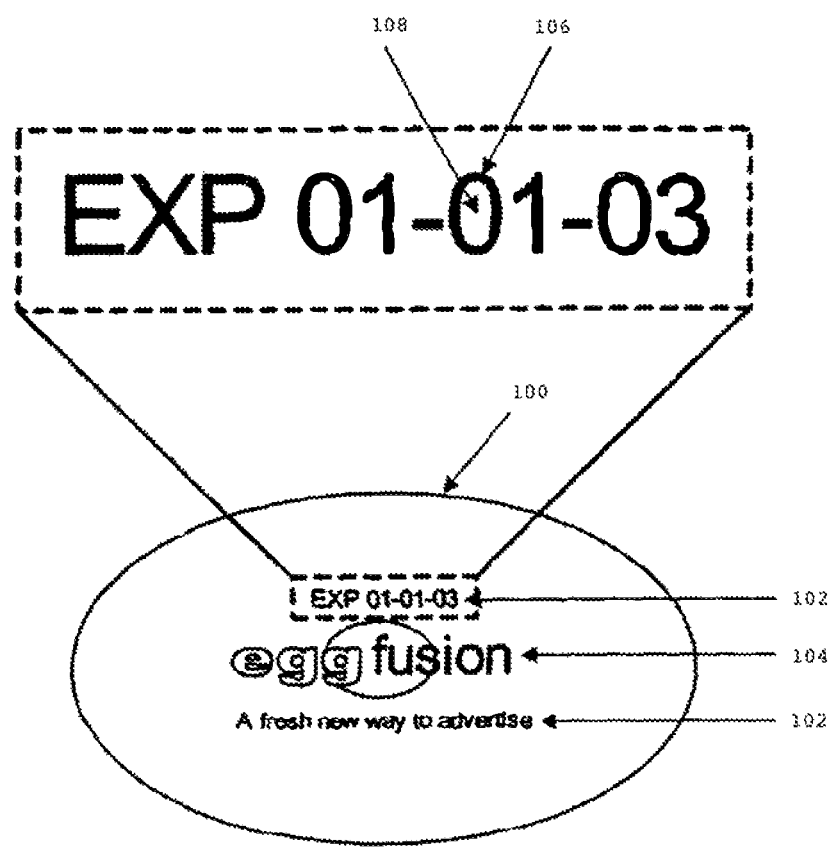
FIG. 1 is a diagram depicting an egg bearing markings using method and apparatus embodiments of the present disclosure.

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

In general, the embodiments herein provide methods and systems for monitoring food packaging operations. Embodiments of the present disclosure are directed to an apparatus as well as a method for laser marking food products as they pass through a marking station, with the marking being carried out by lasers that are designed and configured to render text and graphic representations as the food products pass through the marking station. While reference is made herein to eggs in particular, it should be understood that this disclosure is directed to all food products in which a laser mark may be applied thereon. In the example embodiment, there is provided a method and system for applying markings on an egg by applying a radiant energy source to the shell of the egg so as to cause discoloration of the egg shell to form a permanent marking. However, it is to be appreciated that the embodiments of the claims herein are not limited in any way to the example embodiment, but rather are to be interpreted to cover applying markings to other suitable food products. That is, the embodiments herein can be applied to optimizing laser markings or indicia formed on any suitable food product.

It should be understood that the terms "marking" or "etching" as used herein are intended to mean that a laser is employed as a radiant energy source. The laser beam is applied to leave most of the egg shell unaffected so as to provide contrast between the unaffected areas and the marking. The laser beam ablates and/or discolors the outer surface material from the egg shell. A significant benefit of the use of laser marking is that brown eggs have etched indicia that is a contrasting white color, while white eggs have etched indicia that is a contrasting dark brown color. The structural integrity of the egg shell is not affected because the etching by the beam only affects the outer approximately 5 to approximately 25 micrometers of the egg shell, which is approximately 1.5% to approximately 8% of the thickness of the egg shell.

Figure 2:
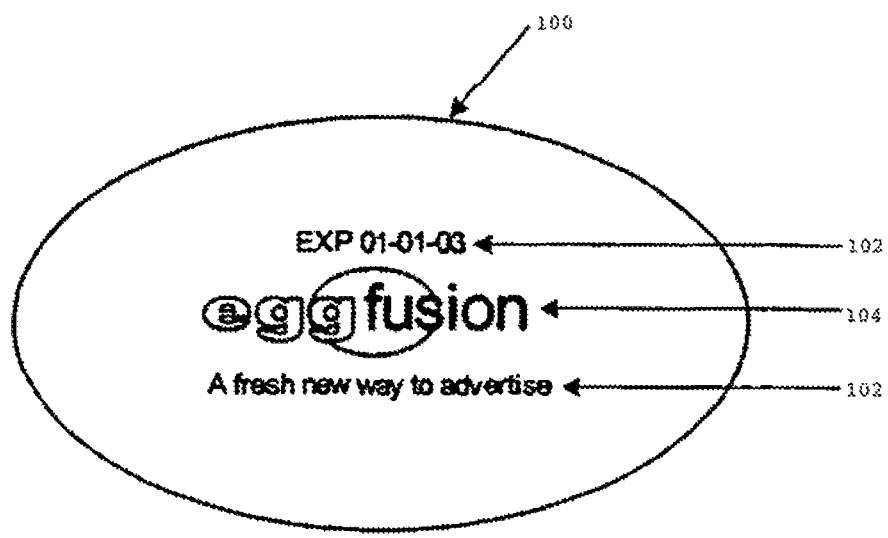
FIG. 2 is a diagram of another view of an egg bearing markings using method and apparatus embodiments of the present disclosure.
Figure 3:
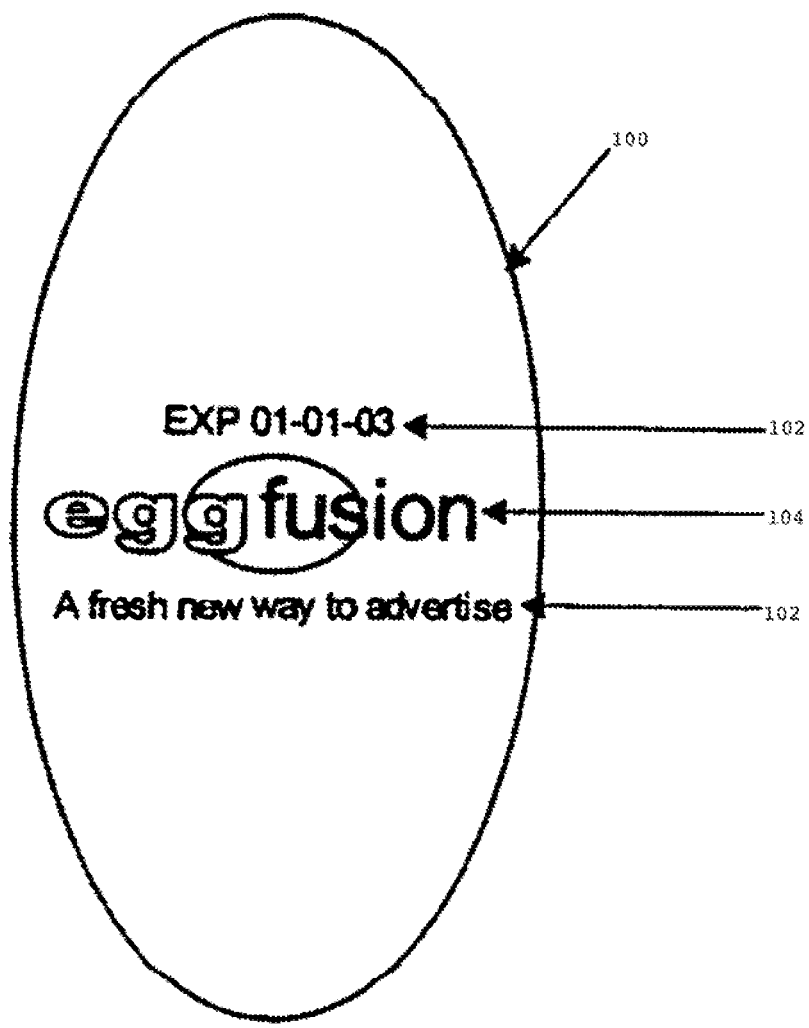
FIG. 3 is a diagram of another view of an egg bearing markings using method and apparatus embodiments of the present disclosure.
Figure 4:
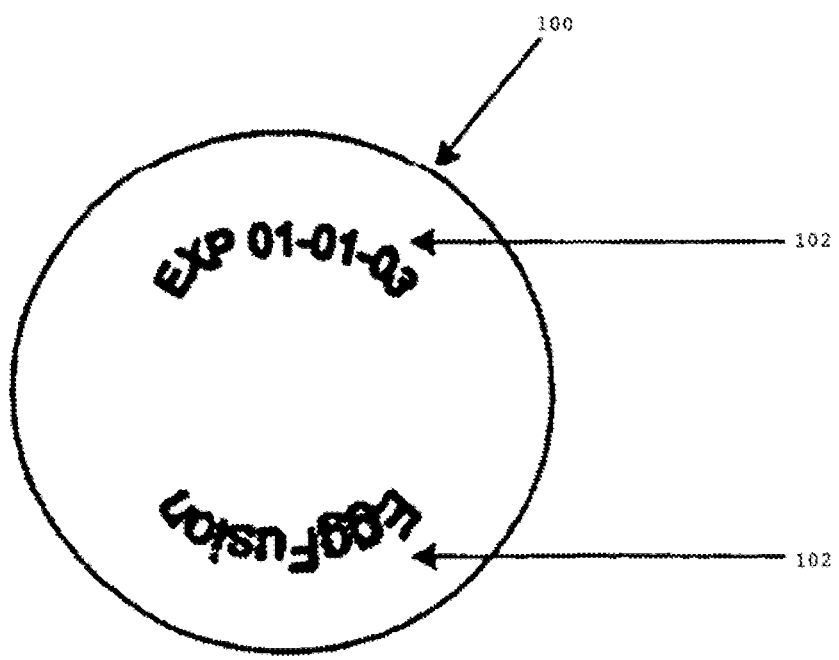
FIG. 4 is a diagram of a top view of an egg bearing markings using method and apparatus embodiments of the present disclosure.

Referring to FIG. 1, an egg 100 is provided with markings or indicia, the markings include text 102 and graphics 104, and can include an advertisement or other graphical information, freshness information, traceability data, or other types of relevant information, or any combination thereof. The markings are formed by discoloring and/or ablating material of the shell to form text 102 and graphics 104, such as that which forms the number 0 as indicated at 106, and leaving other areas of the shell unaffected, such as the area inside the number 0, as indicated at 108. The discoloration and/or ablation may also be done variably so as to form a gradient of discoloration to form the graphics 104, or to create a variety of text 102, such as bold text, italic text, or any type of text or font. That is, some areas may be more discolored than others as, for example, by exposing them to radiant energy for a higher intensity or longer duration, including by making multiple passes, than other areas. The text and graphics may be applied horizontally (FIG. 2), vertically (FIG. 3), or on top (FIG. 4) of the egg.

Radiant energy as, for example, electromagnetic radiation such as visible, infrared, or ultraviolet light, can be used to discolor and/or ablate the egg shell. The radiant energy can be controlled to only discolor a targeted print area 106 of the egg shell. Some areas of the egg can be left unaffected 108 (see FIG. 1). The discoloration of the egg shell is easily viewable because of the contrast of the egg shell color 108 to the discoloration 106 from the radiant energy. A significant benefit of the use of laser marking is that brown eggs have etched indicia that is a contrasting white color, while white eggs have etched indicia that is a contrasting dark brown color. The discoloration can be used to form indicia or marking information on the eggs. The discoloration to form text and graphics can be applied generally simultaneously by one or more radiant energy sources.

No foreign material is required to be added to the egg shell in order for the radiant energy to discolor the egg shell. Thus, no foreign material, such as ink or radiant energy sensitive material that could react with the radiant energy needs to be added to form a marking. The radiant energy is applied to the natural eggshell. Thus, the marking most desirably is formed solely by the effect of the radiant energy on the normally occurring materials of the eggshell itself. This provides several significant benefits. The egg can be properly represented to the consumer as a product with no additives or contaminants. Moreover, because it is not necessary to apply additional materials for purposes of the marking process, it is unnecessary to add the equipment needed to coat the egg with a foreign substance. This greatly simplifies the task of performing the process inline in the production environment of an existing high-speed egg handling apparatus. Additionally, the potentially significant cost of such additional materials is avoided.

In a method according to an embodiment of the present disclosure, a radiant energy source in proximity of an egg directs radiant energy towards the egg. Radiant energy source desirably includes a laser such as a $CO_2$ gas laser adapted to provide light at a wavelength between 9.0 and 10.7 microns, at a minimum of 25 watts, and a projected maximum of 200 watts radiated power, in a beam projected from approximately 100 mm at the surface of the egg. When operated in this power range, the beam ablates and/or discolors the outer surface material from the egg shell. The structural integrity of the egg shell is not affected because the etching by the beam only affects the outer approximately 5 to approximately 25 micrometers of the egg shell, which is approximately 1.5% to approximately 8% of the thickness of the egg shell. The beam is directed onto those areas of the egg, which are to be discolored and turned on and off so as to provide a series of pulses, the beam being "on" for up to about 60 milliseconds during each pulse. During this pulsed actuation, the beam is swept across those areas of the egg surface, which are to be discolored. The sweeping motion may be performed in any manner which will provide the desired relative motion of the beam and the egg. Since the preferred embodiments will operate in association with an egg-handling machine which moves eggs at an extremely rapid speed, the beam must be rapidly moved to produce the desired indicia and also may compensate for the speed of movement of the eggs past the laser apparatus, which is preferably stationary. For example, the radiant energy source may include a beam-sweeping unit incorporating conventional optical elements such as movable or variable lenses, mirrors or prisms adapted to deflect the beam and to vary the deflection with time. Suitable radiant energy sources include, but are not limited to, Sealed $CO_2$ Gas Lasers, Slow-flow $CO_2$ Gas Lasers, TEA $CO_2$ Mask Lasers, CO Gas Lasers, UV Gas Lasers, solid-state visible wavelength lasers, and mid-IR Solid State Lasers. In other embodiments, the radiant energy source may be also be a YAG-type and/or fiber laser system, and may be coupled with a frequency multiplying optical element.

In a method according to an embodiment of the present disclosure, an egg moves through a portion of an egg-grading machine. An egg-grading machine grades the quality of the eggs, and may also transport the eggs towards a packaging machine. Egg-grading machines will move the egg along a path. Somewhere along the path, and preferably immediately before the eggs are packed, a predetermined region can be selected where the egg will pass through and radiant energy can form markings on the egg. Typically, egg-grading machines have calipers that hold the eggs at some point in the path of the egg-grading machine. The radiant energy source may be placed in proximity to this point when the eggs are held so that the radiant energy forms the markings on an egg as it passes through this predetermined region. This eliminates any need for a special apparatus to position the egg. In this way the method is performed inline with the egg-grading machine.

In another embodiment of the present disclosure, a radiant energy source may be placed in proximity of an existing egg-handling machine. Egg-handling machines includes any device or apparatus that will control the movement of an egg along a path, including egg-grading machines. The radiant energy source can be placed in proximity to the egg-handling machine so that the markings may be applied to the egg inline. The egg-handling machine moves an egg along a conveyor apparatus in a particular direction. A radiant energy source is placed in proximity to the conveyor apparatus such that radiant energy is directed towards egg.

Figure 5:
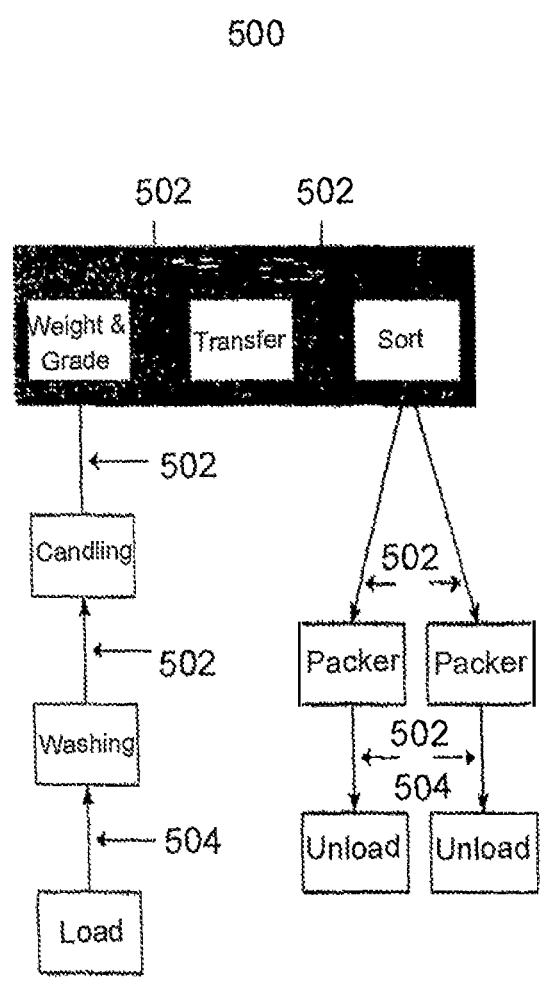
FIG. 5 is a block diagram depicting portions of an egg-handling machine and particularly illustrating inline and offline operations.

There are many variations of egg-handling machines. Most perform some common minimal basic functions. FIG. 5 is a block diagram outlining the basic functions of those machines. The eggs move through these machines 500 while these basic functions are performed, and a radiant energy source can be placed inline 502 or offline 504 in between many of these functions to perform a method of the present disclosure. The eggs are loaded into the machine. An offline procedure may be performed after this function. The eggs are then washed, after which an inline method may be performed. The eggs are candled, after which an inline method may be performed. The eggs move to the grading portion of the machine where they are weighed and graded, after which an inline method may be performed. The eggs are then transferred to a sorter, before which an inline method may be performed. The eggs are then sorted by grades and sizes, after which an inline method may be performed. The eggs are placed into a package, after which an inline method may be performed. An offline process 504 can be performed prior to the load processor and, typically involves human intervention or some other form of mechanical intervention alien to the egg-handling machine. In preferred embodiments of the present disclosure, the radiant energy source can be associated with an existing egg-handling machine without appreciably modifying the machine. The egg-handling machine preferably includes sensors or other suitable monitoring devices for monitoring the operational and environmental parameters of the egg-handling machine.

Figure 6:
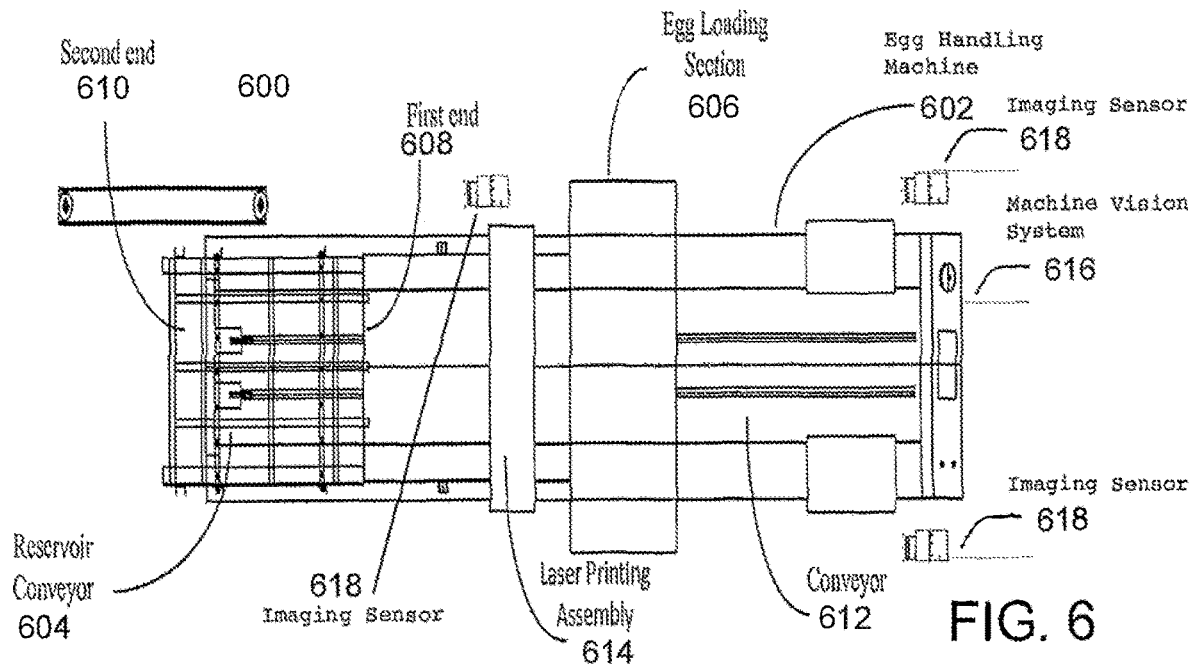
FIG. 6 is a diagrammatic view depicting apparatus for performing an embodiment of the method of the present disclosure.
Figure 7:
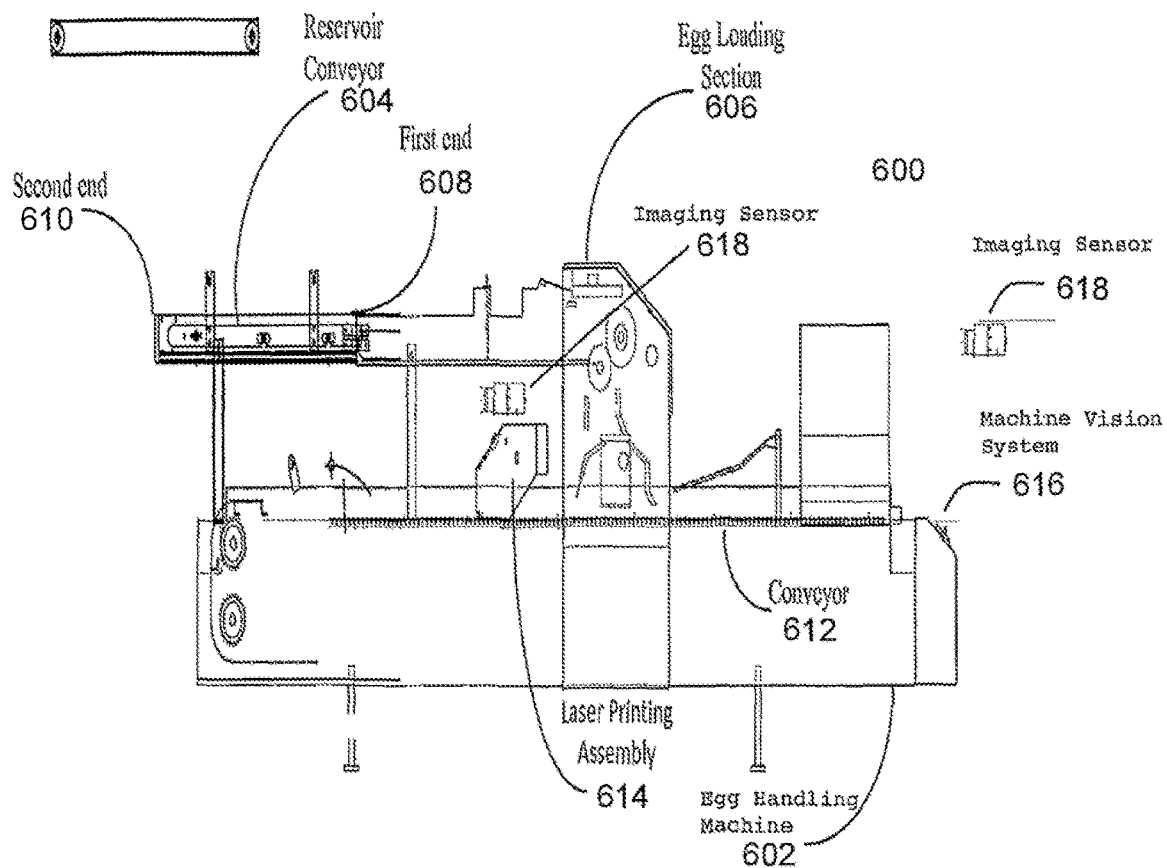
FIG. 7 is a diagrammatic view depicting apparatus for performing an embodiment of the method of the present disclosure.

FIG. 6 illustrates a top-view of a system diagram of an example embodiment of an apparatus 600 that is operable in association with an egg-handling machine 602 that performs washing, candling, grading, and packing of eggs as discussed above. The apparatus includes at least one laser printing assembly 614 comprised of at least one laser source operable to apply laser markings on eggs. FIG. 7 illustrates a side view of the system diagram of an example embodiment of apparatus 600 that is operable in association with egg-handling machine 602. While reference is made herein to eggs in particular, it should be understood that the same principles and features may be applied to an apparatus for applying marks on other suitable food products.

A reservoir conveyor 604 is connected to an egg loading section 606 of the egg handling machine 602 at first end 608 and an egg grading machine (not shown) at second end 610. In an example operation, eggs are passed from the egg grading machine (not shown) to the reservoir conveyor 604 via the second end 610. The reservoir conveyor 604 then passes the eggs along the conveyor to the first end 608 and to then to the egg loading section 606. The egg loading section 606 then receives an egg package (not shown) along a conveyor 612 and then deposits a plurality of eggs into the egg package. The eggs are deposited in the egg package such that the egg package is open and at least a portion of each of the eggs is accessible. In most instances, at least a portion of the eggs extend above the open egg package. Typically the eggs do not travel continuously down the conveyor belt of conveyor 612. Instead as each set of eggs are placed in the egg package at the egg loading section 606, a pause in the conveyor belt of the conveyor 612 occurs. During this pause or dwell time, the at least one laser source in the laser printing assembly 614 prints data on at least one of the eggs in the open egg carton. Preferably, the at least one laser source prints data on each of the eggs in the open egg carton.

The laser printing assembly may be configured on various configurations depending on the markings to be applied onto the eggs and the egg processing speed required in different embodiments or environments. For example, in one embodiment, the laser printing assembly 614 may be situated at the side of the conveyor 612 at a position where a portion of the egg carton is located below the at least one laser source. In another embodiment, the at least one laser source or associated beam delivery or beam deflecting or beam focusing elements may be mounted on a linear slide in the laser printing assembly 614 that moves parallel to the row of eggs during the dwell time and perpendicular to the direction of the conveyor belt of the conveyor 612. Thus, the at least one laser source prints from above the eggs contained in the egg package. The information printed thereon includes text and graphics, and can include an advertisement, freshness information, traceability data, or other types of relevant information, or any combination thereof. In those embodiments in which the laser source prints from above the eggs, egg debris and/or broken eggs will not fall onto the laser source and therefore will not cause downtime or impede print quality.

Figure 8:
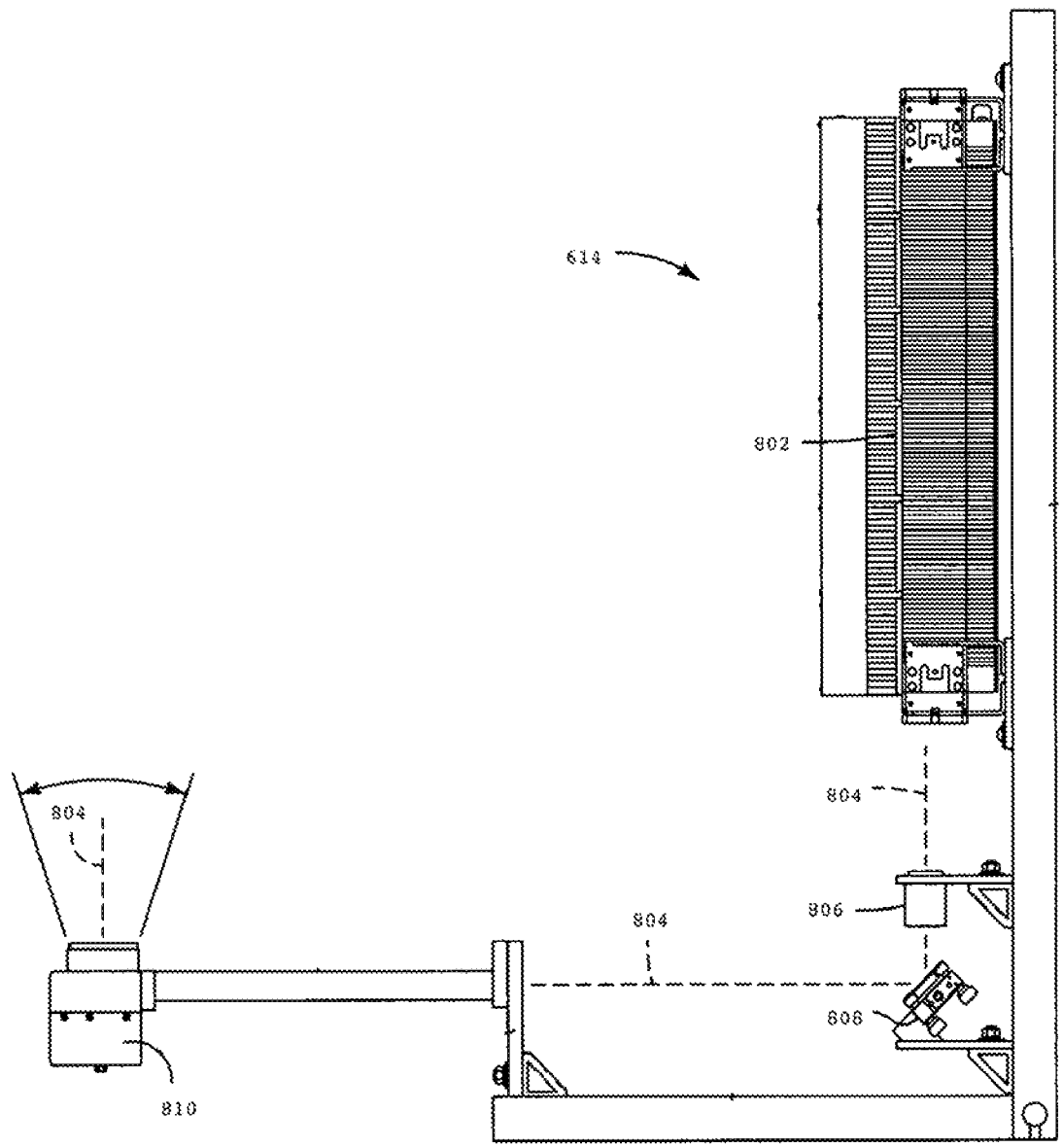
FIG. 8 is a diagrammatic view depicting a laser printing assembly for performing an embodiment of the method of the present disclosure.

FIG. 8 is a diagram of one embodiment of the laser printing assembly 614 of FIGS. 6 and 7. The laser printing assembly 614 includes at least one laser source 802. The laser source 802 outputs a laser beam 804 that passes through a collimating and focusing lens 806, is then reflected off of mirror 808 to a galvanometer scanning head 810 that directs the laser beam to a specific location on the eggs passing thereunder. The laser printing assembly 614 may also include other components as necessary to interact with the apparatus 600 and apply the desired laser markings to the eggs. The laser printing assembly, which includes at least one laser source, preferably has vector scan and raster scan capability for applying the desired markings to the eggs. The laser printing assembly is in communication with an associated computer, controller, central processing unit, or the like ("computer system") that controls the operation of the laser printing assembly and the at least one laser source contained therein.

Figure 9:
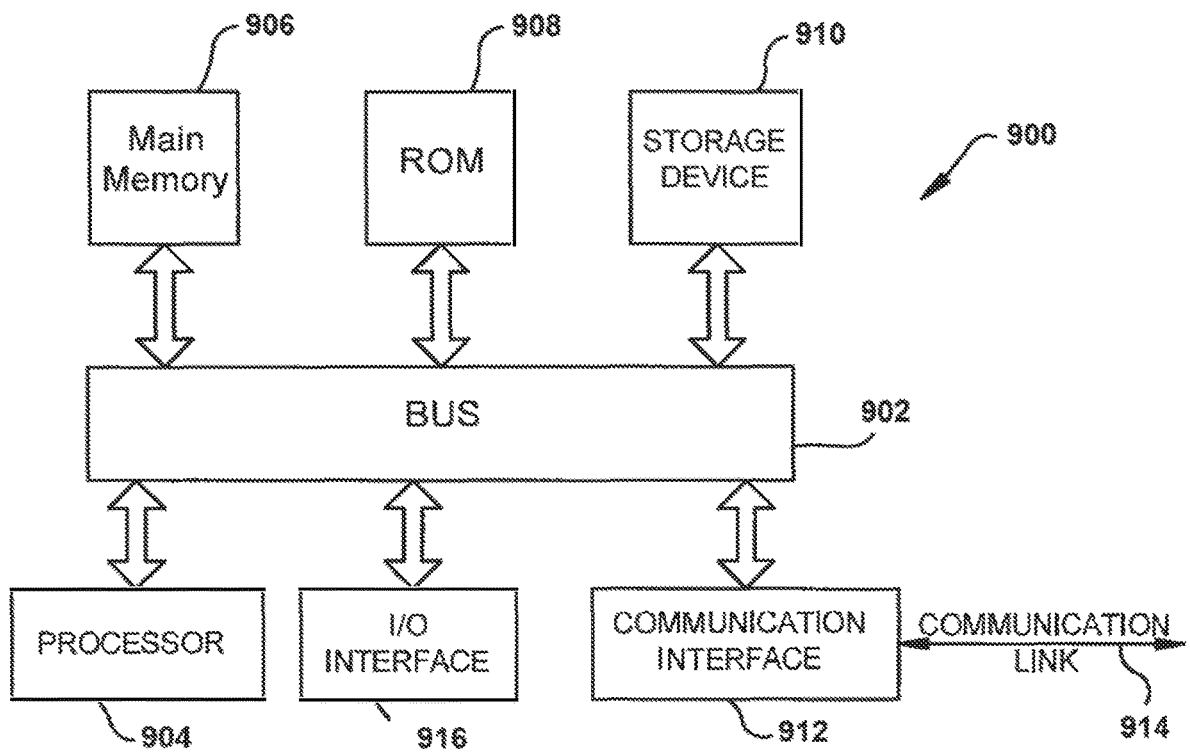
FIG. 9 illustrates an example of a computer system 900 upon which an example embodiment may be implemented.

FIG. 9 illustrates an example of a computer system 900 upon which an example embodiment may be implemented. Computer system 900 is suitable for implementing the functionality of any embodiment of the apparatus 600 described herein in FIGS. 6 and 7.

Computer system 900 includes a bus 902 or other communication mechanism for communicating information and a processor 904 coupled with bus 902 for processing information. Computer system 900 also includes a main memory 906, such as random access memory (RAM) or other dynamic storage device coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk, optical disk, SD memory and/or flash storage, is provided and coupled to bus 902 for storing information and instructions.

An aspect of the example embodiment is related to the use of computer system 900 to implement the method and system for applying laser markings to food products. According to an example embodiment, applying laser markings thereon are provided by computer system 900 in response to processor 904 executing one or more sequences of one or more instructions contained in main memory 906. Such instructions may be read into main memory 906 from another computer-readable medium, such as storage device 910. Execution of the sequence of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 904 for execution. Such a medium may take many forms, including but not limited to non-volatile media, and volatile media. Non-volatile media include, for example, optical or magnetic disks, such as storage device 910. Volatile media include dynamic memory, such as main memory 906. As used herein, tangible media may include volatile and non-volatile media. Common forms of computer-readable media include, for example, floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Various forms of computer-readable media may be involved in carrying one or more sequences of one or more instructions to processor 904 for execution. The instructions received may optionally be stored on storage device 910 either before or after execution by processor 904.

The computer system 900 also includes a communication interface 912 coupled to bus 902, for providing a two-way data communication coupling computer system 900 to communication link 914. Communication link 914 typically provides data communication to other networks or devices. Although the illustrated example has one communication interface 912 and one communication link 914, those skilled in the art should readily appreciate that this is for ease of illustration, as the example embodiments described herein may have any physically realizable number of communication interfaces 912, and/or communication links 914. The server 900 may further include at least one input/output interface 916 connected to the bus 902 and in data communication with one or more user interface devices, such as a mouse, keyboard, monitor/screen, etc. (not explicitly shown).

Notably, while the illustrative embodiment described below shows a single computer system as performing the functions described herein, it is understood that the computer system 900 may comprise, either as a single computer system or as a collection of computer systems, one or more memories, one or more processors, and one or more network interfaces (e.g., adapted to communicate traffic for a collaborative computing session and also traffic on a communication channel other than the collaborative computing session), etc., as may be appreciated by those skilled in the art.

The computer system 900 is operable to control the operation of the laser printing assembly and the at least one laser source contained therein. The computer system 900 is also operable to receive and/or generate data files containing vector and/or rector information for producing or generating movement of the laser beam to produce the desired markings. The computer system 900 is operable to control various parameters of the laser beam, such as power, spot size, spot area, laser speed, pulse width, pulse frequency, and/or modulation frequency. This enables optimization of laser performance which enhances resolution of the applied markings. The magnitude and character of these parameters may be associated with the vector and raster information and stored in memory and programmably varied according to the desired results.

The computer system 900 is preferably interconnected with other computer systems, sensors devices, and other devices associated with other machines, systems, networks, and the like that interact with the apparatus 600 as set forth in FIGS. 6 and 7. For example, the computer system 900 is preferably interconnected with the computer system that controls and monitors the operation of the egg handling machine 602. The computer system preferably receives environmental and product information from the egg-handling machine, such as wash water temperature, rinse water temperature, wash water pH values, egg origin and characteristic information, and the like. The computer system also preferably receives information from position sensors which monitor the operating status of all important moving components of the apparatus 600.

The computer system 900 receives and/or generates the data files for producing the text and/or graphics on the eggs via any suitable means. In one embodiment, the computer system 900 generates the data files based on content, image data, and/or other information ("content information") received from an associated user, other computer system, device, network, or the like. In a preferred embodiment, the computer system includes a content information receiving component 920, which is any suitable software that enables the computer system 900 to receive content information. In a preferred embodiment, the computer system 900 further includes a content information rendering component 922, which is any suitable software that enables the computer system to rendering and/or formatting content information to be applied to the food products. It is to be understood that the content information rendering component 922 suitably renders, formats, or otherwise modifies the received content information for suitable marking onto the food products. As used herein, the phrase "render" may be used to describe such rendering, formatting, or modification of the content.

It is to be understood that content information receiving component 920 and content information rendering component 922 may suitably be implemented as logic operable to be executed by processor 904. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit ("ASIC"), system on a chip ("SoC"), programmable system on a chip ("PSOC"), a programmable/programmed logic device, memory device containing instructions, or the like, or combinational logic embodied in hardware. Logic may also be fully embodied as software stored on a non-transitory, tangible medium which performs a described function when executed by a processor. Logic may suitably comprise one or more modules configured to perform one or more functions.

In a preferred embodiment, the computer system 900 receives the content information from an associated user, other computer system, device, network, or the like via the content information receiving component 922. Content information may be provided to the computer system through the input/output interface 916 via a suitable user interface device, through the communication interface 912 via the communication link 914, via a computer readable medium, or combinations thereof. For example, a user may input the desired content information via a user interface display associated with the computer system. The user may also transmit the content information electronically from a remote location, such as via a remote user interface or electronic mail. The user may also provide a computer readable medium having the content information stored thereon, wherein the content information stored therein accessed by the computer system for processing.

In one embodiment, the environmental information, product information, positional information, and other relevant processing information may be obtained using image capturing devices, machine-readable or human-readable sensors and identifiers, radio frequency identification transponders (RFID) or other transmitting sensors, time stamps or biometric identification, object recognition, texture definition, database management, and other software, data interface equipment consisting of serial, parallel, or network communication, binary data such as switches, gates, push buttons, current sensors, as well as additional forms of data input. The computer system 900 processes the obtained data and uses such data in the control and operation of the laser printing assembly as well as the associated egg-handling machine. By adjusting the depth or other characteristics of the laser marking applied thereon, a more consistent mark is achieved and variations of marking quality between different types of eggs, environments, and the like may be reduced and/or eliminated.

Egg origin and characteristics of the eggs on which the laser marking is to be applied, or the environmental or processing conditions to which the eggs are subject, may affect the quality of the mark to be applied thereon. These factors include, but are not limited to:
  Shell composition (chemical);
  Shell composition (mechanical features);
  Shell thickness;
  Percentage of cuticle remaining;
  Shell strength;
  Species of bird (chicken, ducks, turkeys, etc.);
  Breed of bird;
  Feed for bird;
  Water source for chicken;
  Barn temperature;
  Molt cycle;
  Age of bird;
  Age of the egg
  Color of egg;
  Egg weight (individual and package)
  Egg grade
  Egg surface temperature at time of lasing;
  Egg wetness at time of lasing;
  Egg internal temperature at time of lasing;
  Thermal conductive coefficient of egg shell;
  Curvature of egg relative to the marking;
  Egg washing process parameters;
  Egg rinsing parameters;
  Egg drying parameters;
  Temperature and humidity in the packing facility;
  Time of day;
  Egg packaging parameters;
  Peak temperature reached;
  Degree of focus of the laser during marking;
  Movement of egg during marking;
  Temperature of air local to marking point;
  Effectiveness of vacuum system.
  Data relating to the characteristics associated with eggs or the processing or environmental conditions may be obtained by any suitable means. For example, the egg origin and characteristic information of the eggs may be obtained from the source providing the eggs, inspection/examination prior to the processing, data obtained from previous processing of similar types of eggs, data received or obtained by the computer system 900 during monitoring of the marking process, or any other means. Data relating to the environmental conditions, processing parameters, and the interaction of the laser with the egg shell may be obtained from previous processing of similar types of eggs, data received or obtained by the computer system 900 during monitoring of the marking process, or any other means. The computer system preferably stores the data in memory and uses such data as necessary in the control and operation of the laser printing assembly as well as in the control and operation of the egg-handling machine.

In accordance with an embodiment of the present disclosure, the above described systems and methods allow for the collection of failure mode data and diagnostic information concerning the packer. This data and information can be used to prioritize and drive specific corrective actions. These systems and methods include a mechanism to detect missing eggs in packed cartons to determine whether the carton should be closed. In some embodiments, this mechanism includes a platform independent sensor array. In some embodiments, the sensor array uses one or more contact sensors to determine whether there is empty space in the packed carton in a pocket where an egg should be present. In other embodiments, any non-contact sensor known in the art—including optical sensors and laser sensors—can be used so that there is no need to physically contact the eggs to determine how many eggs are present in the carton. Similar means can be used to detect eggs in the carton lids, which is a common failure mode of the packer, by sensing eggs in unplanned locations within the carton and conveyor. These means can also be employed to detect the size and the shape of the eggs in the cartons as well as whether the cartons are open or closed. In some embodiments, carton size sensing can be achieved with three additional pressure based or optical sensors. In other embodiments, carton size sensing can be achieved using a sprocket and associated sensor for rotation angle and speed. This data can be used for packer speed monitoring as well as efficiency measurements for external display and analysis. The system can also measure carton size and packer speed can be algorithmically determined by measuring the duration of motions concerning the cartons and eggs rather than the actual distance moved.

This data can be used to take protective action, such as removing or reworking problematic cartons before they are lased. This reduces potential wastage of eggs, such as that due to inadequate lasing quality caused by allowing incomplete or overfilled cartons to pass through the system for lasing the eggs. This also prevents the potential for damage to the carton caused by the lasing of empty pockets. Alternatively, the system can be configured to allow leave partial cartons open and allow them to pass through the system and, if desired not mark the eggs or not print on the carton.

In some embodiments, these sensors can be mounted as part of the construction of new packers or as an addition to existing packers without modification to the sensor array.

In some embodiments, the sensor array assembly may include a shaped bar mounted at a place on the packer before the carton reaches the sensors, which bar can make contact with an open or partially open lid to decrease its height so as to reduce the chances that the carton lid will catch on the sensor assembly and either jam the equipment or damage the eggs or carton. This bar may be hinged or otherwise adjustable to allow function with multiple sizes and types of cartons, including closed cartons.

In some embodiments, the sensor assembly includes a mounting mechanism for a barcode reading device, mounted in an orientation to allow carton-specific information to be read from the surface of the carton during the egg sensing process. In alternative embodiments, this barcode reading device is positioned in a location so as to be able to read information from the surface of the carton before the carton reaches the sensor assembly.

In accordance with an embodiment of the present disclosure, the performance or characteristics of the laser may be adjusted in response to selected characteristics of the food product in order to optimize the marking applied thereon. Further, the interaction of the laser with the food product may be monitored by any suitable means and the depth or other characteristics of the laser marking may be adjusted in response to such parameters. By adjusting the depth or other characteristics of the laser marking applied thereon, a more consistent mark is achieved and variations of marking quality between different types of eggs, environments, and the like may be reduced and/or eliminated.

The laser performance parameters may be suitably set or adjusted based on the egg characteristics, environmental conditions, processing conditions, interaction with the laser and the egg shell, and combinations thereof. In a preferred embodiment, the computer system 900 controls various parameters of the laser printing assembly and the at least one laser source to optimize the laser markings to be applied to the eggs. The parameters that may be set or adjusted include, but are not limited to:

Laser power;
Spot size;
Depth of field;
Speed of traverse of the laser beam over the surface of the object being marked;
Number of passes of the laser beam over the surface of the object;
Dwell-time between passes
Power settings within/between passes
Spot size of laser beam within/between passes;
Speed of traverse within/between passes;
Order of passes;
Dwell-time in corners of characters;
Configuration of character fonts;
Configuration of any graphical objects being marked;
Localized heat buildup;
Laser pulse frequency;
Laser wavelength.

The laser performance parameters may be set or adjusted prior to the laser marking process, during the laser marking process in response to data obtained during processing, or any combination thereof. In one embodiment, at least a portion of the eggs are examined or analyzed during and/or after the laser marking process to determine the position and/or characteristics of the eggs that are to be marked and/or the quality and integrity of the information that is marked on the eggs. Any number of environmental and processing conditions may be analyzed to produce a specific optimized or improved marking on the eggs in response to the analyzed conditions.

Figure 10:
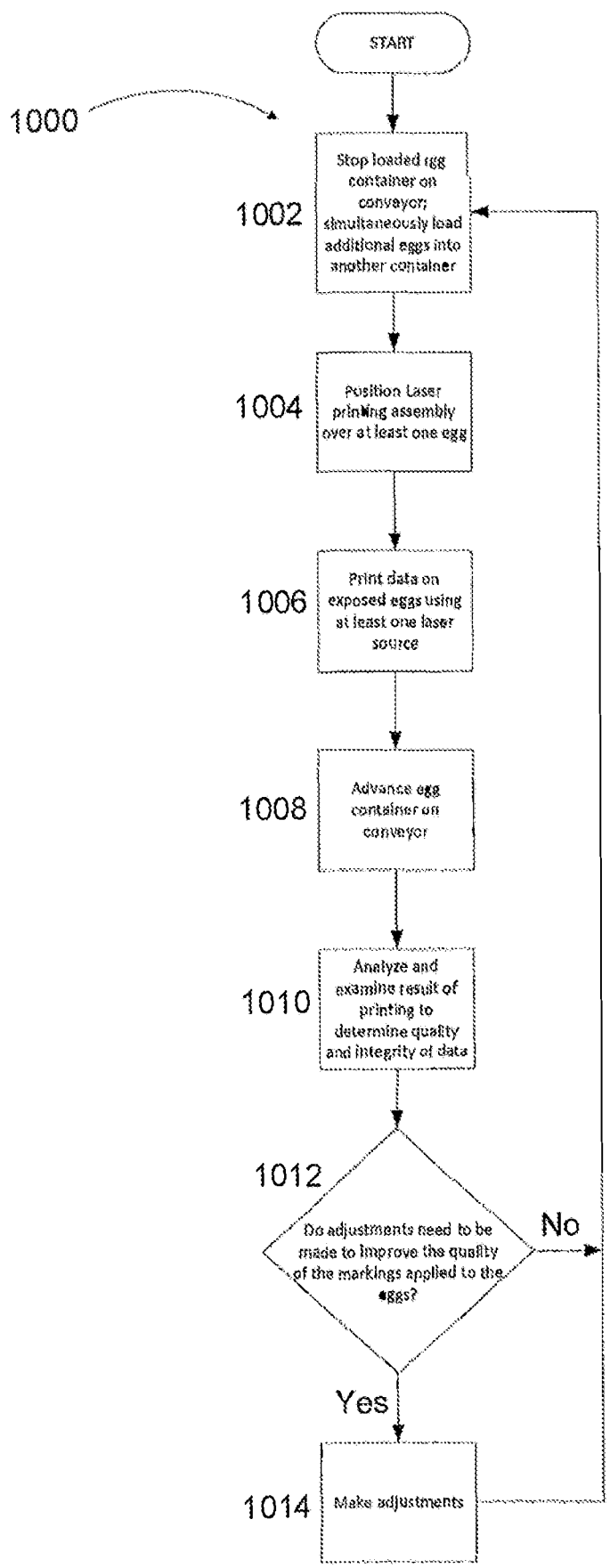
FIG. 10 is an example flow diagram of laser marking on eggs with the apparatus as shown in FIGS. 6 and 7 in accordance with the present disclosure.

FIG. 10 is an example flow diagram 1000 of laser marking on eggs with the apparatus 600 as shown in FIGS. 6 and 7 in accordance with an example implementation. An egg carton stops for a predetermined period of time under the egg loading section 606 which loads the eggs into an egg container. Simultaneously while an egg container is being loaded by the egg loading section 606, a loaded egg container is stopped on the conveyor 612 under the laser printing assembly 614 as shown at 1002. The at least one laser source contained within the laser printing assembly 614 is positioned over at least one egg in the egg container as shown at 1004. The at least one laser source prints data onto the exposed eggs in accordance with the desired laser performance parameters as shown at 1006. The egg container is then advanced on the conveyor 612 as additional eggs are placed in an egg container by the egg loading section 606 as shown at 1008. At 1010, the eggs having data printed thereon are analyzed and examined as discussed above to determine the quality and integrity of the data printed thereon as well as the structural integrity of the eggs. In response to such analysis and examination, the computer system 900 or other suitable means determines if any of the laser performance parameters, environmental conditions, and/or processing conditions need to be adjusted to improve the quality of the markings applied to the eggs as shown at 1012. If it is determined that certain parameters and/or conditions need to be adjusted, such adjustments are made by any suitable means as shown at 1014. The next container of eggs is then processed according to such parameters and laser marking process continues again as shown at 1002. If it is determined that the parameters do not need adjusted, the laser marking continues again as shown at 1002.

Figure 11:
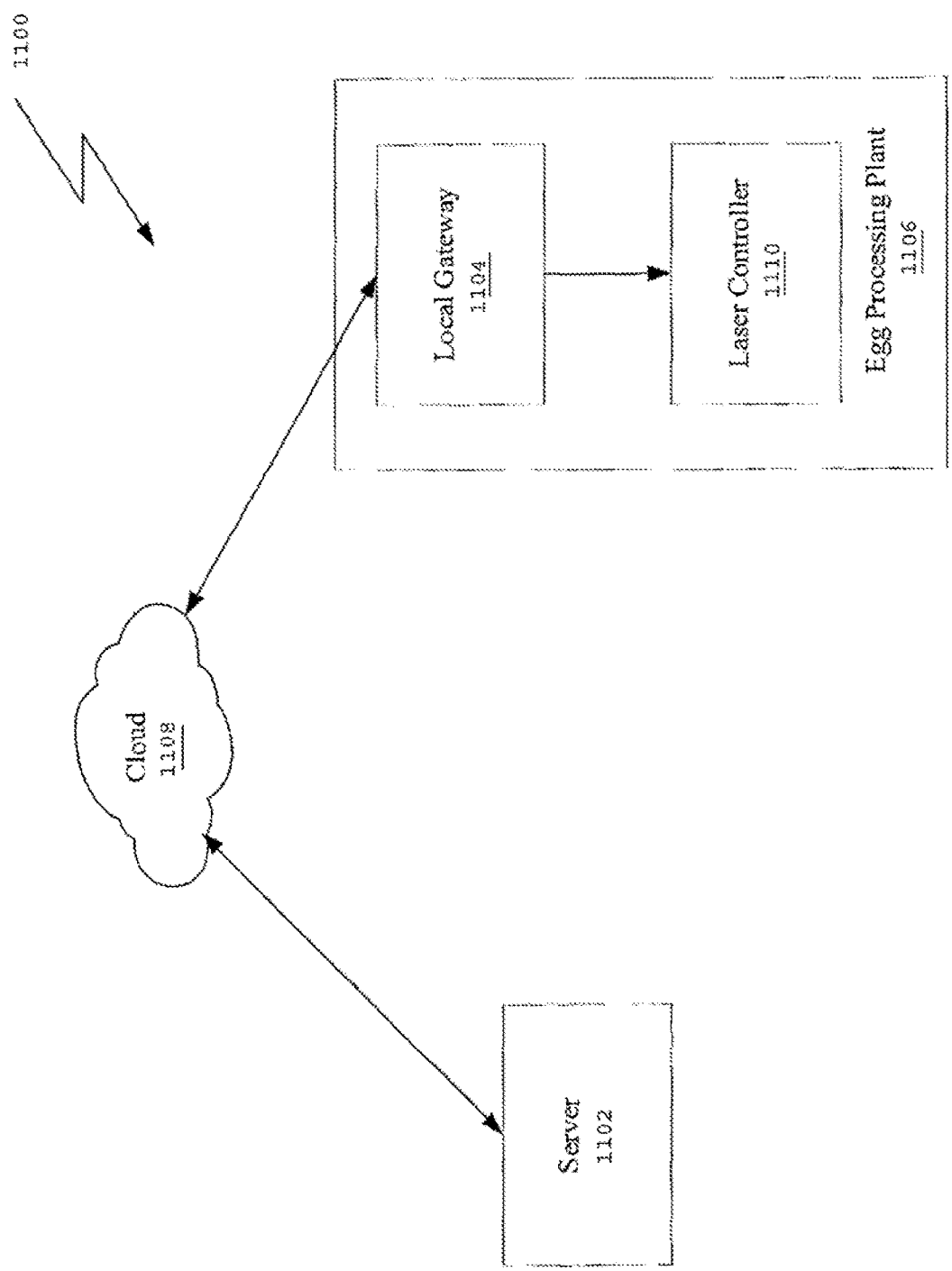
FIG. 11 is a network diagram in accordance with at least one embodiment that protects the laser system of the present disclosure.

FIG. 11 illustrates a network diagram that is part of a system 1100 and method of protecting the laser system in the present disclosure. The system and method protects the laser system by performing daily reset operations on the lasers to ensure that they are operating in compliance with the operating specifications of the system. The system 100 is suitable for performing daily reset operations of any embodiment of the apparatus 600 described herein in FIGS. 6 and 7.

In FIG. 11, the system 1100 may include a server 1102 and a local gateway 1104 server located at an egg processing plant 106 where the laser systems are located for marking eggs. The server 1102 and local gateway 1104 may be in signal communication via a computer network such as the Internet (shown as cloud 1108). The local gateway 1104 may be in signal communication with at least one laser controller 1110 located within the egg processing plant 1106.

Data concerning the optimal operations of the lasers are stored in server 1102. Additional data concerning various parameters of the various lasers in their present state, as well as the output are collected and further transmitted to and stored in Server 1102. This data may be collected manually, or it may collected via a series of sensors or other means known in the art.

In order to maintain specification compliance, the server 1102 may send a command to the laser controller 1110 via the cloud 1108 and local gateway 1104 to perform a system reset on the laser system. This command may be sent once a day, for example, at 12 am every night. Once received, the laser controller 1110 resets all the laser values and setting and returns the laser system to compliance with the specification of operation.

By maintaining specification compliance among all laser controllers 1110 the relative performance of systems operated by laser controller 1110 can be evaluated from a set of known base performance characteristics thus simplifying routine troubleshooting, improving yield, improving safety, allowing preventative maintenance diagnosis, identifying best and worst producing items of equipment.

In some embodiments, the laser controller 1110 resets all laser values to predetermined values. The predetermined values may be uniform, or may be specific to each laser system or each individual laser. In other embodiments, these predetermined laser values are calculated using various parameters known about each individual laser, as discussed with respect to FIG. 9, when compared to the various performance characteristics discussed with respect to FIG. 9. In still other embodiments, these laser values are recalculated each day based on performance data.

In a preferred embodiment, the laser controller 1110 includes logic that contains a specific subroutine that is triggered automatically on a daily basis (at a specific time each day, typically outside of normal production hours). This routine interrogates the central database in the plant (contained within the gateway hardware) for the standardized operating parameters applicable to the upcoming day. These are known as 'Mark Methods' and 'Mark Files'. The Mark Methods include all necessary laser parameters (including but not limited to power, speed, pass count, pass order, specific to each type of graphical element (logo, text, etc)). There may be multiple Mark Methods applicable to an individual egg processing facility. Mark Files may be specific to the source of the eggs (whether produced within an in-line facility, or sourced as a 'Nest Run' from an offline facility).

Each 'Mark File' includes all necessary laser parameters to define the layout and fixed content of the mark to be applied to eggs at a specific egg processing facility. There may be multiple Mark Files applicable to a specific facility, since different customers/retailers of that facility may require different graphical or textual elements. Together, the Mark File and Mark Method define all necessary laser parameters that are applicable for specific mark content on eggs from a specific source.

The program subroutine overwrites any previous such Mark Files and Mark Methods held within the laser marking hardware, replacing any such content already present. In this way, any changes made locally in the egg processing facility, are removed and replaced with a centrally controlled, common set of laser parameter data that is applicable to the marks required to be produced and the eggs being marked.

Adjustment of these local values requires a specialized user interface which is not local to the laser marking systems or the farm, and is not otherwise made available to the farm employees or other technical staff. These local values are only adjusted during initial installation and during periodic (typically annual) maintenance checks by specialized staff with specialized tools to effect these changes.

In a preferred embodiment, local laser-specific information (such as a power offset or X-Y-Z marking offset) may additionally be stored in the laser controller (and not be overwritten), or stored on a per-laser basis on the server via the cloud and downloaded via the cloud and gateway to the specific laser marking system every night. There are two categories of settings—mechanical/laser power settings, which are specific to each laser marking system (see above paragraph), and the global values which are stored centrally. The global values are offsets which apply to each and every laser in the system, those being offsets applicable to a 'standard' laser. The local power offset and X-Y-Z offset settings bring that specific laser marking system into compliance with the 'standard' laser values, based on locally-made measurements and locally applied adjustments.

Figure 12:
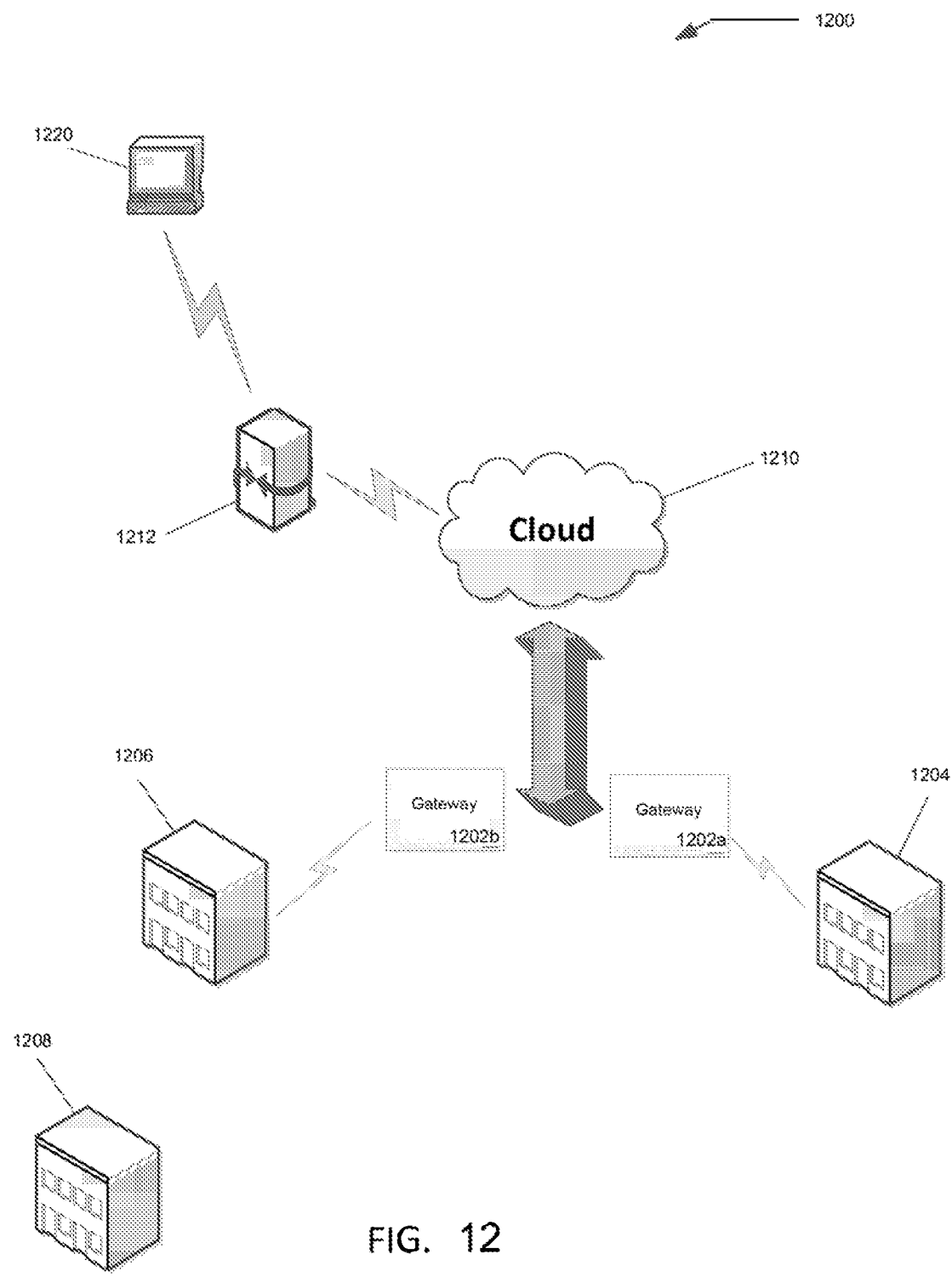
FIG. 12 is a block diagram illustrating components of a gateway and cloud-based data system, including a remote storage location having a database containing traceability data and related information, designed to collect, consolidate, and store production, performance, and compliance data related to egg grading and processing, in accordance with the present disclosure.
Figure 15:
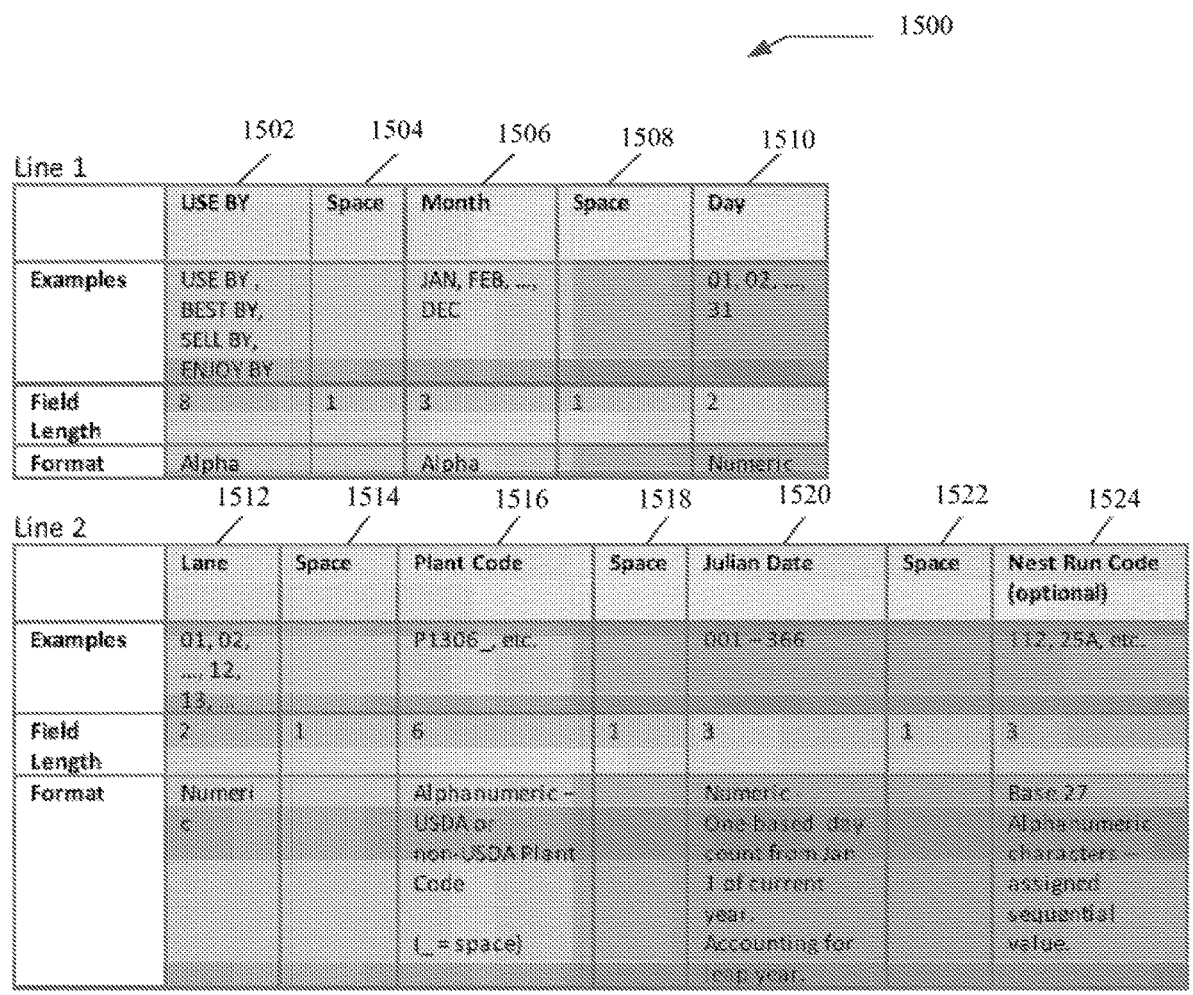
FIG. 15 is a schematic diagram illustrating an example of traceability data that may be marked on a carton containing shell eggs, together with an illustration of the parameters of the elements of the traceability data, which may be stored in the example data entry shown in FIG. 13, in accordance with the present disclosure.

FIG. 12 shows an exemplary block diagram of a cloud-based approach for connecting numerous remote devices with a remote storage location having a database containing data entries related to the operation of one or more shell egg grading and packaging facilities. In FIG. 12, gateway 1202a is in communication with grading and packaging facility 1204 and gateway 1202b grading and packaging facility 1206. Grading and packaging facility 1206 also processes shell eggs received from grading and packaging facility 1208. Satellite egg grading and packing facility 1208 is an off-line facility that ships eggs to grading and packing facility 1206, which in turn grades and processes the eggs and transmits the relevant data to gateway 1202b. All three grading and packaging facilities may have received nest run eggs. As the grading and packaging facilities 1204 and 1206 grade and process shell eggs, these facilities may laser mark the eggs with traceability data, examples of which are shown in FIGS. 14 and 15. Traceability data may include a sell-by date, a Packing Plant code, and a Packing Date as a Julian number. Generally, these three codes may be printed on the cartons containing the processed eggs, and may also be laser marked on individual eggs.

In some embodiments, data relating to Nest Runs may be created at the source farm (nest run source) and a unique Identifier Code is created for that batch of Nest Run eggs. Such data is stored into the server via a gateway and cloud at the source farm. When such a batch of Nest Run eggs arrives at the facility which will process those eggs, that unique identifier is read (e.g. barcode scanner, RFID tag, manual entry into a HMI screen, computer-based entry, or equivalent). When the batch of Nest Run eggs is then processed, that same unique identifier is entered into the server via a similar device, and the use of those eggs is recorded back into the server. For carton codes, the nest run source farm ID may be directly printed onto the carton. For egg codes, the time, date and location of use (from the trace code) can be used to look up the source of the eggs being processed, and that source farm for the nest run eggs can be identified.

Related traceability data may also include egg size and grade, the time of the day of processing, the lane and column of the conveyor running through an egg packing apparatus, the egg brand, a company's logo, and carton size. A grading and packaging facility may also have egg packing equipment with the capability to monitor the instantaneous performance of the egg packing equipment and collect real-time process and performance data on egg cleaning, washing and grading equipment. Simple equipment is added to the egg cleaning, washing and/or grading equipment, which monitors the instantaneous performance of the egg cleaning, washing and/or grading equipment, and collects detailed performance data on the monitored equipment, including temperature, presence/no-presence, and rate information.

In some embodiments, the process parameters (including but not limited to values such as egg temperatures, water temperature and pH levels) are measured with sensors that either directly or indirectly measure those values (e.g. pH sensors directly in the water, non-contact optical infrared sensors measuring the surface temperature of the egg, thermocouples measuring water pipe temperatures, etc). Those temperature sensors produce voltage or current outputs that are scaled using electronic input modules to values reflecting Celsius or Fahrenheit. Those temperature values are then compared with regulatory standards for water temperatures to determine compliance or non-compliance with regulatory standards.

Egg counting is done with contact or non-contact sensors, that detect the presence or non-presence of eggs in coordination with a sensor that provides a timing input (when the timing input triggers, the presence/non-presence sensors are checked). The use of a timing sensor allows consistent operation over many machinery speeds. With this method, the egg detection sensors have to be mechanically aligned so that they are triggered 'on' when the timing sensor is triggered 'on'.

In other embodiments, the machinery speed is measured using a rotary encoder or equivalent timing pulse, and the relative proportion of time that the egg is detected/not-detected is used to indicate presence/non-presence of eggs. The latter method has the advantage that the relative mechanical position of the egg sensing sensors, to the timing sensor, is not critical.

This performance and processing data, the traceability and related data, as it is collected, may pass through the cloud 1210 to a remote storage location 1212. Here the collected data is consolidated and archived, and is available for remote analysis of detailed production output and system performance characteristics, total volume and product-level data to improve scheduling and production control activities, evaluating individual plant production, identifying cause/ effect relationships with production processes and methods, and supporting egg-source-specific product recalls if required.

Because the consolidated data may include traceability for information that may be laser marked on eggs or printed on cartons, such as, for example, sell-by dates, Packing Plant codes, the egg brand, and a company's logo, this type of data may also be made available to local systems, such as a laser marking system or a local data display, in a grading and packaging facility.

The data as it is collected may be transmitted through the cloud 1210 to a remote storage location 1212. The collected data is consolidated and archived, and is available for remote analysis thereof for any suitable purpose, such as to improve processing control and output, determine output and performance characteristics, improve, determine trends, determine or verify regulatory compliance, identify risks, support product recall procedures, provide source verification, and the like. In some embodiments, a portion of the collected and/or analyzed data may flow back by way of the cloud 1210 through gateway 1202 to one or more of the egg processing facilities for use thereby. The remote storage location 1212 may be accessible remotely to consumers, retails, egg providers, egg processing facilities, governmental entities, and other interested party by any suitable remote communication device as illustrated by 1220. Preferably, access to the remote storage device is only after suitable authentication and/or encryption processes.

It is appreciated by those skilled in the art that the cloud-based approach shown in FIG. 12 is only an exemplary topology diagram of a cloud-computing methodology and that for the purpose of connecting numerous remote devices a cloud-based implementation may take other forms and include other components, as necessary.

Figure 13:
FIG. 13 is a schematic diagram illustrating an example of a data entry in the database of FIG. 12, which is configured to contain traceability data and related information, that may be accessed for marking on shell eggs and packaging, as well as being accessible for production planning and product recall, in accordance with the present disclosure.

Turning to FIG. 13, a schematic diagram illustrating an example of a data entry 1300 in a database containing traceability and related data is shown. This database is one of several that may be located at remote storage location 1212, and is a database that may be accessed primarily for markings on shell eggs and packaging, as well as being accessible for production planning and product recall purposes. In data entry 1300, all items labeled as (tracecode) constitute static lookup, i.e., characters that directly represent specific information, as defined in the egg and carton trace codes of FIGS. 14 and 15, respectively. For example, "MAR" directly represents the month March. Items marked with X denote data that is retrieved via database lookup based on the static data: Packing Plant, Julian Date, Time, and Column information in the trace code. Accordingly, these four trace code elements may together identify a specific, unique point in time at a specific grading and packaging facility, and may also point to a specific data entry 1300 in the database that can be accessed to retrieve additional data related to that point in time (i.e., the items marked with an "X" in FIG. 13).

As for the Time interval item, the three minute interval, in combination with other trace code information, enables determination of the marketing campaign, egg source, and other information related to the marked egg to be traceable to within 180 seconds of its packing. A job or nest run is very likely to change part way through a 3 minute interval. In order to assure the interval printed on the egg represents the actual product's history, when a new job starts, the system will switch immediately to print the Time code corresponding to the next 3-minute interval.

FIG. 14 shows a schematic diagram 1400 illustrating an example of traceability data in accordance with the present invention. The traceability data may be of a form other than the decimal system. In this example implementation, the traceability data uses an alphanumeric Base 27 character set, comprising the numeric characters 1-9 and the upper case letters ACDEFHJKLMNPRTVWXY. The numbers and letters of this character set are designed to allow a large amount of data to be contained in traceability data consisting of far fewer alphanumeric characters than other character set choices would facilitate. Moreover, potentially-confusing numbers and uppercase letters when printed, such as "Z," (potentially confused with "2") "S," (potentially confused with the number "5"), "B," (potentially confused with the number "8"), "I" (potentially confused with the number "1") and the letters "O" and "Q" and the number zero (potentially confused with the letter D) are not included in the character set.

In addition to eliminating potentially-confusing numbers and uppercase letters by selecting the numbers and uppercase letters to be included in the alphanumeric Base 27 (or other number) character set, the gateway 1202 or remote storage device 1212 of FIG. 12 may include a processor that performs the same function. That is, the processor includes executable instructions that filters out any potentially confusing numbers and uppercase letters that may have entered the system, or prevents these numbers and uppercase letters from appearing in trace codes. Likewise, the processor may be programmed to filter out any language, phrase, or terms that may be considered profane, vulgar, defamatory, etc., or offensive to consumers or other recipients. Because the remote storage device 1212 is in communication with Gateways 1202 at multiple grading and packaging facilities, the processor may constantly be updated to filter out undesirable language as the need arises, and may communicate with the grading and packaging facilities to advise them of any changes in trace code policies.

In some embodiments the data entry devices used to interpret the data are designed to interpret the data inputs I, Z, S, B & O or Q as 1, 2, 5, 8 & 0 respectively thus accommodating and auto correcting any human errors in data entry. An alternate embodiment may use the reverse logic and representation or a subset of these additional characters.

Returning to FIG. 14, the traceability data illustrated comprises 16 characters and 2 spaces on two lines. Line 1 has 4 elements: Grade 1402 consisting of up to 2 upper case letters; Size 1404 consisting of 1 upper case letter; a space 1406; and Packing Plant Designation 1408 consisting of up to 6 alphanumeric characters. Line 2 also has 4 elements: Julian Date 1412 consisting of 3 numeric characters; a space 1414; Column 1416 consisting of 2 numeric characters using Base 27; and Time (3 minute interval) 1418 consisting of up to 2 alphanumeric characters using Base 27. Examples of traceability data for FIG. 14, intended for inline and nested eggs, might be "AAJ P1664E" for Line 1 and "077 1371" for Line 2.

Turning to FIG. 15, the traceability data illustrated is intended for USDA-approved carton marking and comprises 20-23 characters and 4-5 spaces on two lines. Line 1 has 5 elements: Use By 1502 consisting of up to 8 upper case letters; a space 1504; Month 1506 consisting of 3 capital letters; a space 1508; and Day 1510 consisting of 2 numeric characters. Some traceability data may also include an additional space followed by a 4-digit element showing the year (not illustrated). Line 2 has 7 elements: Lane 1512 consisting of 2 numeric characters (with leading zeros); a space 1514; Packing Plant 1516 consisting of up to 6 alphanumeric characters; a space 1518; Julian Date 1520 consisting of 3 numeric characters; a space 422; and Nest Run Code (optional) 1524 consisting of 3 alphanumeric characters using Base 27. An example of trace codes for FIG. 15 might be "USE BY OCT 27" for Line 1 and "11 P1306 325" for Line 2. In some embodiments, Use By 1502 may constitute other data, such Sell By or Expiration dates, by way of non-limiting example.

It should be noted that traceability data used on non-USDA marking has a different format, such as that illustrated in FIG. 13. That format has the advantage of requiring fewer characters which requires less time for printing, in turn allowing more eggs to be marked and processed in a given time interval.

Figure 16:
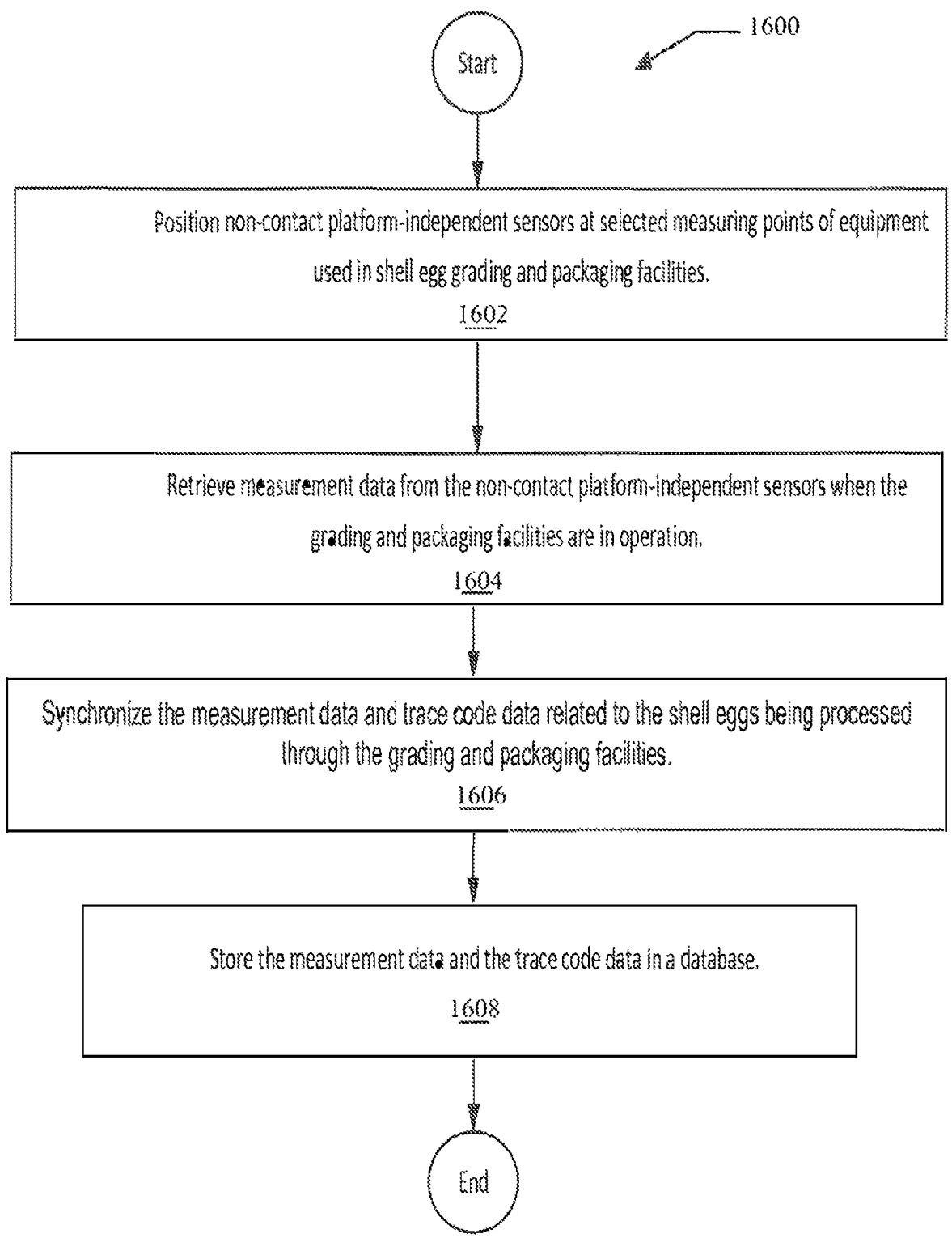
FIG. 16 is an example flow diagram of a method of monitoring equipment of various shell egg grading and packing systems in accordance with some embodiments of the present disclosure.

FIG. 16 shows an example flow diagram of a method of monitoring equipment found in various shell egg grading and packing systems in accordance with the present disclosure. The equipment may include equipment that washes and cleans shell eggs, removes contaminants from the eggs, grades and sizes eggs, and removes undesirable eggs from processing. The equipment found in the packing systems may include egg conveyors, egg loaders, carton printing stations, carton lid closing systems, and speed control.

In step 1602, the non-contact platform-independent sensors discussed above with respect to FIG. 9 are positioned at select measuring points of the equipment used in shell egg grading and packing facilities. Because the sensors are non-contact and platform independent, no electrical control interaction with the host equipment is required, simplifying the installation and providing independent verification of equipment performance. This also ensures suitability for most commonly-found egg grading and packing equipment models, and shell egg grading and packing systems, and allows host equipment to be upgraded without significant change in the monitoring equipment or data collection systems. In alternate embodiments, contact sensors may be used. In such a case, one skilled in the art would be able to effectively mount the sensor array to be compatible with most grading and packing equipment models.

In step 1604, measurement data is retrieved from the platform-independent sensors when the grading and packaging facilities are in operation. The measurement data is synchronized with trace code data related to the shell eggs being processed through the grading and packaging facilities in step 1606. This synchronization may be implemented using trace code data from the grading and packing facility's own system used in marking eggs and packaging, or the measurement data may be time coded with its own timestamp generated by the system.

In step 1608, the measurement data and the related code data is stored in a database. This database may be located in a cloud-based remote storage location. Here, the collected data is consolidated and archived, and is available for remote analysis of detailed production output and system performance characteristics, total volume and product-level data to improve schedule and production control activities, evaluating individual plant production, identifying cause/effect relationships with production process and methods, and supporting egg-source-specific product recalls if required. Because the consolidated data may also include trace codes for information that may be laser marked on eggs or printed on cartons, such as, for example, sell-by dates, packing plant codes, the egg brand, and a company's logo, this type of data may also be made available to local systems, such as a laser marking system or a local data display, in a grading and packaging facility.

In some embodiments, this database and the information stored therein are used in conjunction with the cloud-based systems described above. In alternate embodiments, this database and information stored therein are part of the cloud-based systems described above, and the information is used in conjunction with the other data stored in the cloud-based systems.

It will be understood that various aspects or details of the invention may be changed without departing from the scope of the invention. It is not exhaustive and does not limit the claimed inventions to the precise form disclosed. Furthermore, the foregoing description is for the purpose of illustration only, and not for the purpose of limitation. Modifications and variations are possible in light of the above description or may be acquired from practicing the invention. The claims and their equivalents define the scope of the invention.

The invention claimed is:

1. A monitoring system for monitoring performance of a plurality of processing components of a food processing system as processing operations are performed on food products while the food products travel along a path through the food processing system, the monitoring system comprising:
   a processor operable for controlling the monitoring system;
   at least one sensor operatively coupled to the processor and controlled in part by the processor, wherein the at least one sensor is positioned adjacent to the path along which food products travel, wherein the at least one sensor is operable to capture status data associated with at least one operational parameter of at least one processing component of the food processing system and generate a plurality of operational data therefrom;
   a non-transient memory operatively coupled to the processor and operable to store a plurality of standard operating parameters for the plurality of processing components; and
   at least one input/output interface operatively coupled to the processor;
   wherein the processor is operable to:
   receive at least a portion of the generated operational data from the at least one sensor;
   compare at least a portion of the received operational data with at least a portion of the plurality of standard operating parameters;
   determine, based on the comparison, whether to adjust to at least one operational parameter of at least one processing component;
   in response to a determination that at least one operational parameter of at least one processing component should be adjusted, adjust the at least one operational parameter of the at least one processing component.

2. The monitoring system of claim 1, wherein the food processing system includes
   a food product grading component configured to grade the quality of food products processed by the food processing system;
   a food product packaging component configured to package at least a plurality of the food products processed by the food processing system; and
   a conveyor component for transporting food products thereon along a path through the food processing system.

3. The monitoring system of claim 2, wherein the at least one sensor is operable to capture status data associated with at least one operational parameter of at least one of the food product grading component, the food product packaging component, and the conveyor component.

4. The monitoring system of claim 3, wherein the food products are eggs.

5. The monitoring system of claim 3, wherein the status data comprises a plurality of measurement data associated with at least one operational parameter of at least one of the food product grading component, the food product packaging component, and the conveyor component.

6. The monitoring system of claim 3, wherein at least a portion of the memory is implemented in a cloud-based component communicatively coupled to the processor and is operable to store at least a portion of the generated operational data.

7. The monitoring system of claim 3, wherein the processor is further operable to:
obtain at least one data capture parameter with respect to status data to be captured by the at least one sensor, and
transmit the at least one data capture parameter to the at least one sensor for capturing status data in accordance therewith.

8. The monitoring system of claim 3, wherein the processor is further operable to obtain a plurality of traceability data associated with the food products processed by the processing system.

9. The monitoring system of claim 8, wherein the traceability data includes at least one of source location details associated with the food products, source environmental and processing conditions associated with the food products, processing facility details associated with the food processing system, use data associated with time periods in which the food products should be used, and combinations thereof.

10. The monitoring system of claim 8, wherein the processor is further operable to store at least a portion of the generated operational data in the memory, wherein the generated operational data is stored in relation to the traceability data associated with the food products processed by the processing system.

11. The monitoring system of claim 10, wherein the processor is further operable to receive a request from an associated user, via the at least one input/output interface to retrieve selected operational data and the traceability data associated therewith stored in the memory, and to retrieve the requested operational data.

12. The monitoring system of claim 11, wherein the processor is further operable to retrieve the requested operational data based on the traceability data.

* * * * *